US012482922B2

(12) United States Patent
Montoya Moreno et al.

(10) Patent No.: US 12,482,922 B2
(45) Date of Patent: Nov. 25, 2025

(54) DISPLAY ASSEMBLY, CLIENT DEVICE COMPRISING THE DISPLAY ASSEMBLY, AND METHOD OF MANUFACTURING THE DISPLAY ASSEMBLY

(71) Applicant: HUAWEI TECHNOLOGIES CO., LTD., Shenzhen (CN)

(72) Inventors: Resti Montoya Moreno, Helsinki (FI); Janne Ilvonen, Helsinki (FI); Dong Liu, Dongguan (CN); Alexander Khripkov, Helsinki (FI); Ruiyuan Tian, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 18/335,805

(22) Filed: Jun. 15, 2023

(65) Prior Publication Data

US 2023/0420828 A1 Dec. 28, 2023

Related U.S. Application Data

(63) Continuation of application No. PCT/EP2020/086465, filed on Dec. 16, 2020.

(51) Int. Cl.

*H01Q 1/24* (2006.01)
*H01Q 1/38* (2006.01)
*H01Q 5/378* (2015.01)
*H01Q 9/04* (2006.01)

(52) U.S. Cl.

CPC ............... *H01Q 1/243* (2013.01); *H01Q 1/38* (2013.01); *H01Q 5/378* (2015.01); *H01Q 9/0428* (2013.01)

(58) Field of Classification Search

CPC .......... H01Q 1/243; H01Q 1/38; H01Q 5/378; H01Q 9/0428; H01Q 1/52; H01Q 9/0414; H01Q 19/28; H01Q 1/22

See application file for complete search history.

(56) References Cited

U.S. PATENT DOCUMENTS

| | | | |
|---|---|---|---|
| 10,305,172 B2 | 5/2019 | Noori et al. | |
| 10,418,687 B2 * | 9/2019 | Mow | H01Q 19/30 |
| 10,763,566 B2 * | 9/2020 | Noori | H01Q 9/0414 |
| 10,777,895 B2 | 9/2020 | Paulotto et al. | |
| 2010/0315389 A1 | 12/2010 | Sorrell et al. | |
| 2018/0059846 A1 | 3/2018 | Tada et al. | |
| 2020/0021016 A1 | 1/2020 | Son et al. | |
| 2020/0280133 A1 | 9/2020 | Avser et al. | |

* cited by examiner

*Primary Examiner* — Seung H Lee

(74) *Attorney, Agent, or Firm* — Leydig, Voit & Mayer, Ltd.

(57) ABSTRACT

A display assembly, a client device having the display assembly, and a method of manufacturing the display assembly are disclosed. Antenna performance in, e.g., mobile devices is improved via a robust and multifunctional multi-layer glass structure for a display of the mobile device or the like which allows placing auxiliary antenna elements between layers of the display structure. The structure allows placing the auxiliary antenna elements at different positions within it. The auxiliary antenna elements can be placed under and/or within the display, instead of, for example, surrounding the display. The multi-layer structure is continuous from the display surface to the substrate and gives freedom to place the auxiliary antenna elements, including metal elements, between any layers of the structure.

20 Claims, 21 Drawing Sheets

100

Farfield 27 GHz:
(Realized Gain)

H-Pol

610

V-Pol

Farfield 40 GHz:
(Realized Gain)

H-Pol

620

V-Pol

| 3D Run ID | REduceouterParaCl | H | OuterParasiticResistivit |
|---|---|---|---|
| 1 | 0 | 0 | 10 |
| 4 | 0.3 | 0 | 10 |
| 7 | 0.6 | 0 | 10 |
| 23 | 0 | 0 | 10000 |

1600

DISPLAY ASSEMBLY, CLIENT DEVICE COMPRISING THE DISPLAY ASSEMBLY, AND METHOD OF MANUFACTURING THE DISPLAY ASSEMBLY

CROSS-REFERENCE TO RELATED APPLICATIONS

This application is a continuation of International Application No. PCT/EP2020/086465, filed on Dec. 16, 2020, the disclosure of which is hereby incorporated by reference in its entirety.

TECHNICAL FIELD

The present disclosure relates to the field of displays, and, more particularly, to a display assembly, a client device comprising the display assembly, and a method of manufacturing the display assembly.

BACKGROUND

So called millimeter wave (mmWave) bands (frequency range approximately 30 to 300 gigahertz, and wavelength range 1 cm to 1 mm) have been used e.g. in point-to-point communications, intersatellite links, and point-to-multipoint communications. They are planned to be used in various fifth generation (5G) wireless network systems also.

5G mmWave is planned to support minimum dual layer to fulfil demodulation performance requirements. Specifically, a 5G user equipment (UE) is to use omni-coverage mmWave antennas with generally constant effective isotropic radiated power (EIRP) or effective isotropic sensitivity (EIS), diversity and multiple-input and multiple-output (MIMO) performance to achieve stable communication in all directions and orientations. These requirements for omni-coverage result from e.g. enhanced mobile broadband (eMBB) dense urban use-cases in which there is a high probability for loss of signal (LOS) between a UE and a small cell base station (BS) or consumer premises equipment (CPE). Typically, a non-line-of-sight channel may have at least 20 dB higher attenuation in comparison with a line-of-sight channel. Therefore, dual layers supported by a single polarization UE in a non-line-of-sight channel would result in a degraded data throughput. Thus, in order to achieve stable communication in all directions and orientations, a 5G UE is planned to have omni-coverage dual-polarized mmWave antennas. Here, dual-polarized means that an antenna needs to have two polarizations (e.g. horizontal polarization and vertical polarization, or more generally polarization 1 and polarization 2) in a single direction.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective of the present disclosure to improve antenna performance in mobile devices via a robust and multifunctional multi-layer glass structure or assembly for a display of a mobile device which allows placing antenna elements between layers of the display structure or assembly. The foregoing and other objectives are achieved by the features of the independent claims. Further implementation forms are apparent from the dependent claims, the description and the figures.

According to a first aspect of the present disclosure, a display assembly is provided. The display assembly comprises a substrate that comprises a main antenna element. The display assembly further comprises a display panel that is arranged above the substrate. The display assembly further comprises a glass layer that comprises a primary part that extends over the display panel and a secondary part that extends by the display panel towards an upper surface of the substrate. At least one of the primary part and the secondary part comprises at least two sub-layers. The display assembly further comprises at least one auxiliary antenna element, each arranged between two adjoining sub-layers of the at least two sub-layers. The present disclosure allows improving antenna performance in e.g. mobile devices via a robust and multifunctional multi-layer glass structure or assembly for a display of the mobile device or the like which allows placing auxiliary antenna elements between layers of the display structure or assembly. The structure allows placing the auxiliary antenna elements at different positions within it. The auxiliary antenna elements can be placed under and/or within the display, instead of, for example, surrounding the display. The multi-layer structure is continuous from the display surface to the substrate and gives freedom to place the auxiliary antenna elements, including metal elements, between any layers of the structure.

In an implementation form of the first aspect, the secondary part is arranged at least partially above the main antenna element. This implementation form allows insertion of auxiliary antenna element at different, optimal heights from the main antenna element.

In an implementation form of the first aspect, the sub-layers of the secondary part are of a material having a high permittivity. This implementation form allows improved beam-steering properties by making it possible to direct the antenna beam towards the display side by collimation like in a lens. Hence, improved display side radiation may be provided.

In an implementation form of the first aspect, the high permittivity comprises permittivity larger than four. This implementation form allows improved beam-steering properties by making it possible to direct the antenna beam towards the display side by collimation like in a lens. Hence, improved display side radiation may be provided.

In an implementation form of the first aspect, the material having the high permittivity comprises glass, plastic or ceramics. This implementation form allows improved beam-steering properties by making it possible to direct the antenna beam towards the display side by collimation like in a lens. Hence, improved display side radiation may be provided.

In an implementation form of the first aspect, at least one of the at least one auxiliary antenna element comprises a parasitic element, a director, a reflector, or a surface wave rejector. The parasitic elements allow dual band operation, the directors allow improved directivity, and reflectors allow stopping leakage energy. The surface wave rejectors allow keeping surface wave from propagating inside the glass layer of the display assembly.

In an implementation form of the first aspect, the display assembly comprises at least two auxiliary antenna elements, each of which is arranged at a different vertical distance from the main antenna element. This implementation form allows the auxiliary antenna elements to be implemented within a same volume but at different heights. The more layers the display assembly comprises, the more auxiliary antenna elements may be included at different heights. The more there are layers, the more freedom there is to choose the optimal distance from the main antenna element for improving the performance.

In an implementation form of the first aspect, the display assembly comprises at least two auxiliary antenna elements arranged such that the at least two auxiliary antenna elements boost performance of at least one of: a single linear polarization, two orthogonal linear polarizations, or circular polarization. The auxiliary antenna elements may be used to boost the performance of the polarizations. One or more auxiliary antenna elements may be present in the multi-layer structure in order to boost the performance of each polarization.

In an implementation form of the first aspect, the display assembly comprises at least two auxiliary antenna elements arranged such that the at least two auxiliary antenna elements boost end-fire direction performance. The different layers allow placing the auxiliary antenna elements at an optimal distance from the main antenna element(s), which can enhance the bandwidth, directivity or other antenna properties for end-fire directions.

In an implementation form of the first aspect, the display panel is arranged at a reduced horizontal distance from a metal frame of a host device. This implementation form enables radiation for a reduced gap between the display panel and the metal frame of the host device, such as a mobile device, since even though the gap is reduced the electrical length of the gap is increased due to the high dielectric constant/permittivity, thus reducing the cut-off frequency of the gap.

In an implementation form of the first aspect, the reduced horizontal distance comprises a horizontal distance less than two millimeters. This implementation form allows radiation for a reduced gap (less than two millimeters) between the display panel and the metal frame of the host device, such as a mobile device, since even though the gap is reduced the electrical length of the gap is increased due to the high dielectric constant/permittivity, thus reducing the cut-off frequency of the gap.

In an implementation form of the first aspect, at least one of the at least one auxiliary antenna element is metallic. This implementation form allows metal structures between the layers. For example, a coherent retroreflector made of metal sheets may be implemented, allowing greater performance of common mode antennas.

According to a second aspect of the present disclosure, a client device is provided. The client device comprises the display assembly according to the first aspect of the present disclosure. The present disclosure allows a client device with improved antenna performance via a robust and multifunctional multi-layer glass structure or assembly for a display of the client device which allows placing auxiliary antenna elements between layers of the display structure or assembly. The structure allows placing the auxiliary antenna elements at different positions within it. The auxiliary antenna elements can be placed under and/or within the display, instead of, for example, surrounding the display. The multi-layer structure is continuous from the display surface to the substrate and gives freedom to place the auxiliary antenna elements, including metal elements, between any layers of the structure.

According to a third aspect of the present disclosure, a method of manufacturing a display assembly is provided. The method of manufacturing the display assembly comprises arranging a primary part of a glass layer, wherein the primary part is to be extended over a display panel. The method further comprises arranging at least one auxiliary antenna element, each between two adjoining sub-layers of at least one of the primary part of the glass layer or a secondary part of the glass layer, wherein at least one of the primary part and the secondary part comprises at least two sub-layers. The method further comprises arranging the secondary part of the glass layer, wherein the secondary part is to be extended by the display panel towards an upper surface of a substrate. The method further comprises arranging the display panel below the primary part of the glass layer and by the secondary part of the glass layer. The method further comprises arranging the substrate below the display panel and the secondary part of the glass layer, wherein the substrate comprises a main antenna element. The present disclosure allows manufacturing a display assembly with improved antenna performance for e.g. mobile devices via a robust and multifunctional multi-layer glass structure or assembly for a display of the mobile device or the like which allows placing auxiliary antenna elements between layers of the display structure or assembly. The structure allows placing the auxiliary antenna elements at different positions within it. The auxiliary antenna elements can be placed under and/or within the display, instead of, for example, surrounding the display. The multi-layer structure is continuous from the display surface to the substrate and gives freedom to place the auxiliary antenna elements, including metal elements, between any layers of the structure.

Many of the features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, identical reference signs refer to identical or at least functionally equivalent features.

DETAILED DESCRIPTION

In the following description, reference is made to the accompanying drawings, which form part of the disclosure and show, by way of illustration, specific aspects of the present disclosure. It is understood that other aspects may be utilized and structural or logical changes may be made without departing from the scope of the present disclosure. The following detailed description, therefore, is not to be taken in a limiting sense, as the scope of the present disclosure is defined in the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus or device is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
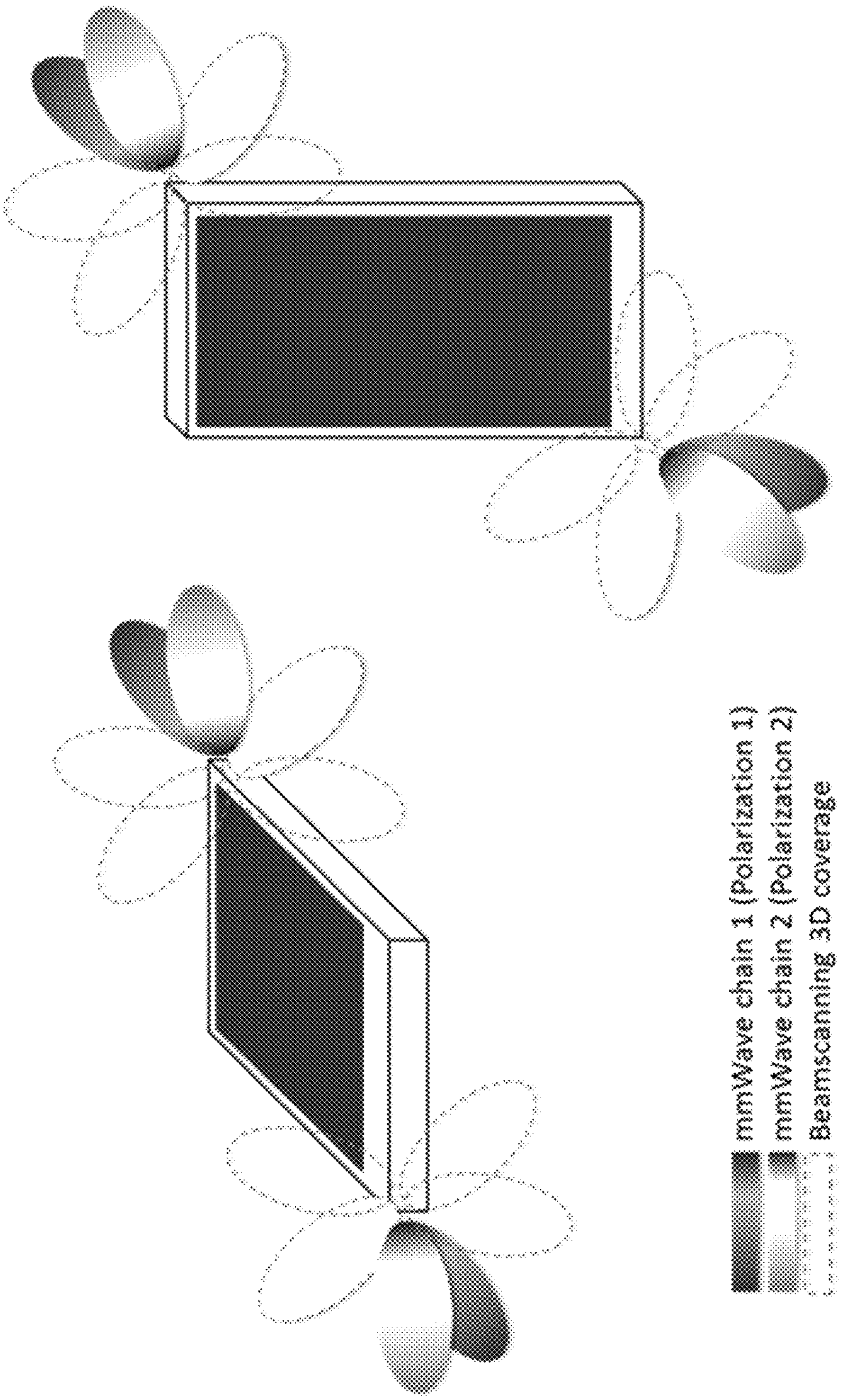
FIG. 1 is a diagram illustrating a user equipment with omni-coverage mmWave antennas.

As discussed earlier, a 5G user equipment (UE) is planned to use omni-coverage mmWave antennas with generally constant effective isotropic radiated power (EIRP) or effective isotropic sensitivity (EIS), diversity and multiple-input and multiple-output (MIMO) performance to achieve stable communication in all directions and orientations, as illustrated in diagram 100 of FIG. 1. In order to achieve this stable communication in all directions and orientations, a 5G UE is planned to have omni-coverage dual-polarized mmWave antennas. Here, dual-polarized means that an antenna needs to have two polarizations (e.g. horizontal polarization and vertical polarization, or more generally polarization 1 and polarization 2) in a single direction.

As will be discussed in more detail below, the present disclosure provides a robust and multifunctional multi-layered structure or assembly for a display of a host device (such as the client device 1700 of FIG. 17 or the like) which allows placing auxiliary antenna elements between the layers of the display structure or assembly, thereby improving antenna performance in the host device.

In other words, the present disclosure allows a layered display assembly enabling insertion of antenna elements at different, optimal heights, as well as utilizing the layered structure for mounting a surface wave rejection structure.

The antenna performance is improved with a multi-layered structure which is a part of a display distribution of the host device. The structure allows placing auxiliary antenna elements at different positions within it. The auxiliary antenna elements can be placed under and/or within the display, instead of, for example, surrounding the display. The multi-layered structure is continuous from the display surface to the substrate and gives freedom to place the auxiliary antenna elements, including metal elements, between layers of the structure.

Advantages of the present disclosure include enhanced radio frequency properties, such as bandwidth, directivity, pattern shape, and beam-steering properties. Furthermore, the multi-layered structure allows implementing surface wave rejection.

Figure 2A:
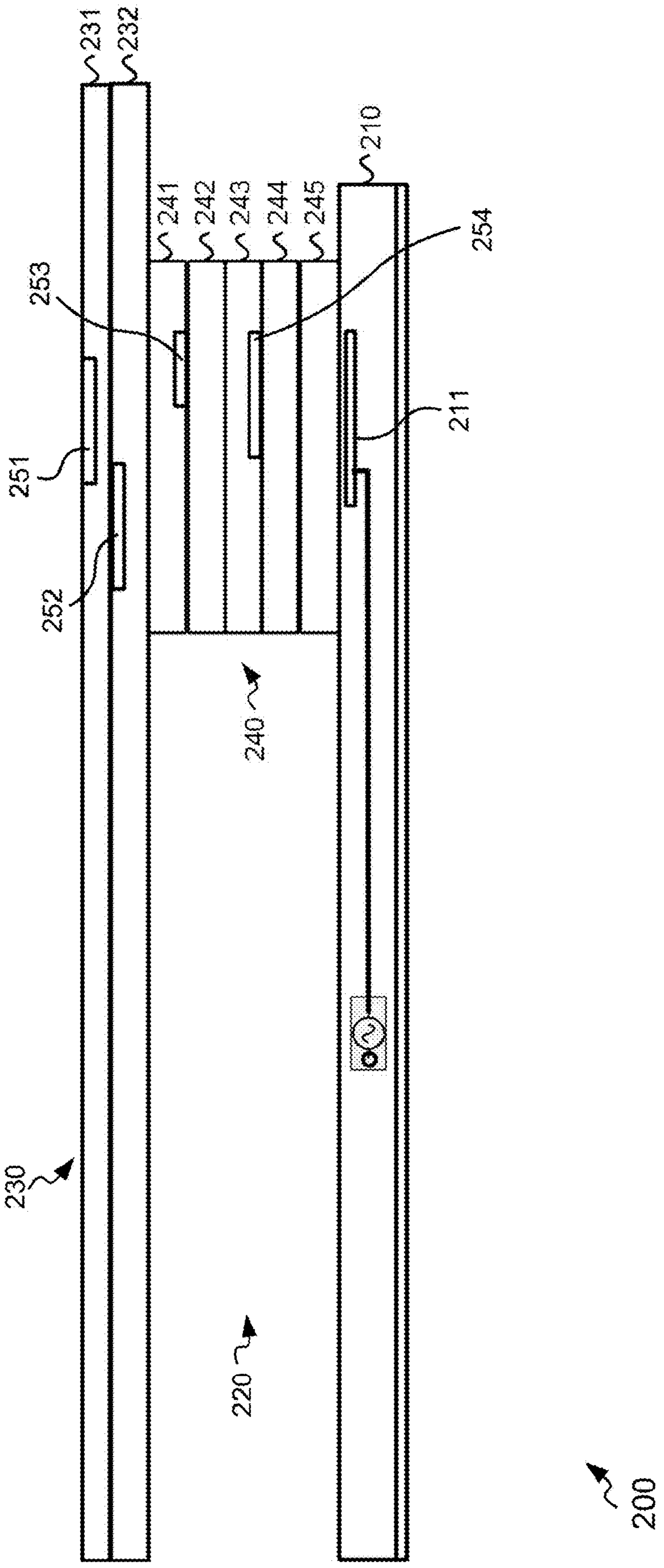
FIGS. 2A-2C are diagrams illustrating multi-layered display assemblies comprising auxiliary antenna elements at different heights within, according to embodiments of the disclosure.
Figure 2B:
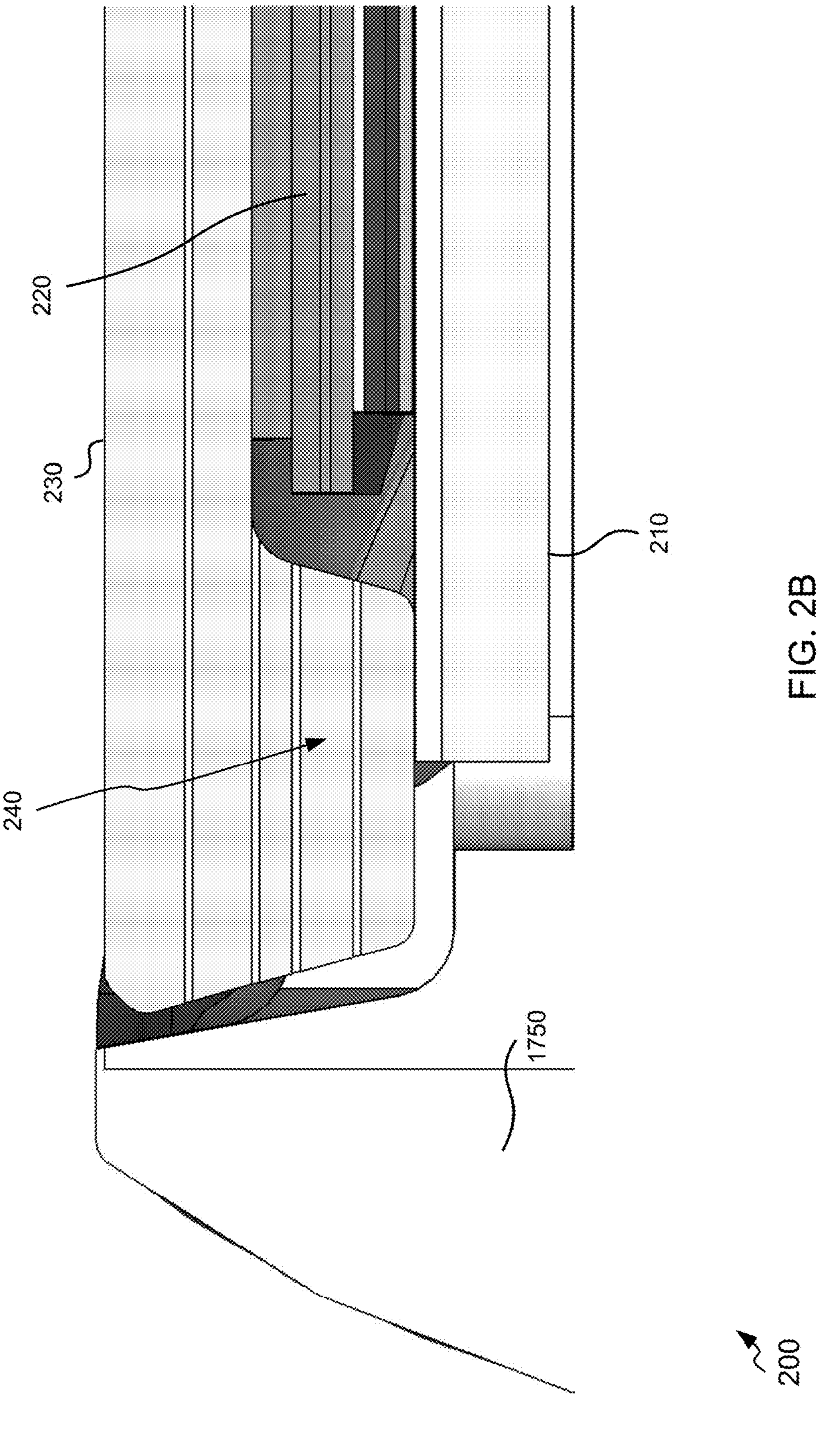
Figure 2C:
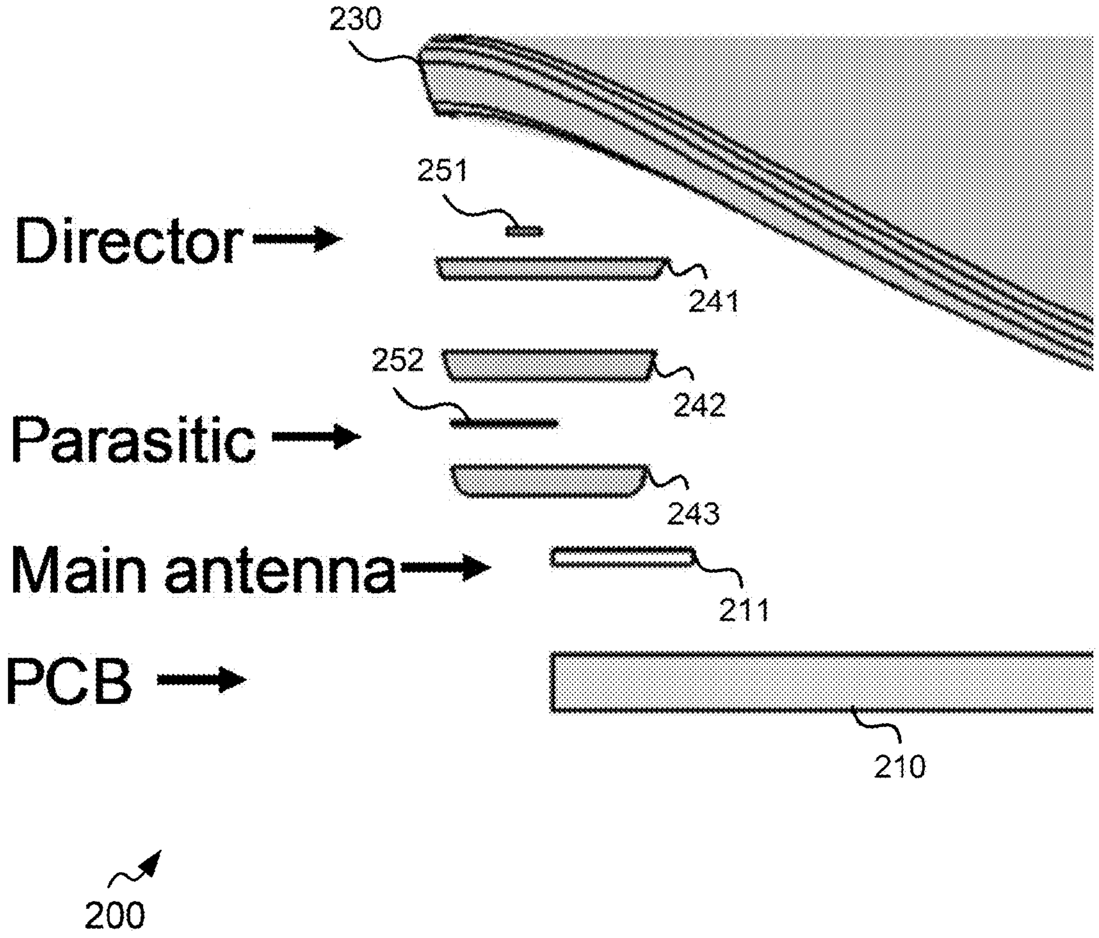

Next, example embodiments of a display assembly 200 are described based on FIGS. 2A-2C. Some of the features of the described devices are optional features which provide further advantages.

FIGS. 2A-2C are diagrams illustrating multi-layered display assemblies 200 comprising auxiliary antenna elements 251, 252, 253, 254 at different heights within, according to embodiments of the present disclosure.

The display assembly 200 comprises a substrate 210, such as a printed circuit board (PCB), a liquid crystal polymer (LCP) substrate, a flexible printed circuit (FPC) substrate, a module or film substrate, or the like. The substrate 210 comprises a main antenna element 211.

The display assembly 200 further comprises a display panel 220. The display panel 220 is arranged above the substrate 210.

The display assembly 200 further comprises a glass layer. The glass layer comprises a primary part 230 that extends over the display panel 220.

The glass layer further comprises a secondary part 240 that extends by the display panel 220 towards an upper surface of the substrate 210. At least in some embodiments, the secondary part 240 may be arranged at least partially above the main antenna (or radio frequency) element 211.

The primary part 230 and/or the secondary part 240 comprises at least two sub-layers 231, 232 and 241, 242, 243, 244, 245, respectively. At least in some embodiments, the sub-layers 241, 242, 243, 244, 245 of the secondary part 240 may be of a material having a high permittivity $\varepsilon_r$. For example, the high permittivity $\varepsilon_r$ may comprise permittivity $\varepsilon_r$ larger than four. The high permittivity $\varepsilon_r$ allows directing the antenna beam towards the display side by collimation like in a lens. In an example, the material having the high permittivity may comprise glass, plastic, ceramics, or other suitable material. In at least some embodiments, the thickness or height of the various sub-layers 231, 232 and 241, 242, 243, 244, 245 may vary from each other.

The display assembly 200 further comprises one or more auxiliary antenna (or radio frequency) elements 251, 252, 253, 254. Each auxiliary antenna element 251, 252, 253, 254 is arranged between two adjoining sub-layers of the at least two sub-layers 231, 232, 241, 242, 243, 244, 245. For example, the auxiliary antenna element(s) 251, 252, 253, 254 may comprise one or more of a parasitic element (used e.g. for dual band operation), a director (used e.g. for improved directivity), a reflector (used e.g. for stopping leakage energy), and/or a surface wave rejector. At least in some embodiments, one or more auxiliary antenna element 251, 252, 253, 254 may be metallic.

In other words, the layered or laminated structure allows implementing the auxiliary antenna elements (such as metallic ones) within a same volume and at specific different heights optimal for the antenna operation. Multiple different kinds of auxiliary antenna elements 251, 252, 253, 254 may be added between the sub-layers 231, 232, 241, 242, 243, 244, 245, for example, both a surface wave rejection element and directors may be added in a same implementation. For example, the display assembly 200 may comprise at least two auxiliary antenna elements 251, 252, 253, 254, each of which is arranged at a different vertical distance from the main antenna element 211.

The above-described layered structure allows reducing glass thickness while keeping the same robustness against impacts. Reducing the glass thickness may reduce the intensity of surface waves which are generally harmful for common-mode antennas (generally vertical polarity antennas). Additionally/alternatively, surface wave rejection structure elements may be introduced among the auxiliary antenna elements to stop the surface waves from propagating inside the display.

Accordingly, the above-described layered structure is robust to impacts, allows reducing surface waves and may boost antenna performance when auxiliary antenna elements 251, 252, 253, 254 are added between the sub-layers 231, 232, 241, 242, 243, 244, 245. Robustness to impacts is achieved due to energy being absorbed in the thicker part of the structure (i.e. the part comprising the secondary part 240).

Additionally or alternatively, the display assembly 200 may comprise at least two auxiliary antenna elements 251, 252, 253, 254 that are arranged such that the at least two auxiliary antenna elements 251, 252, 253, 254 boost the performance of a single linear polarization, two orthogonal linear polarizations, and/or a circular polarization. In other words, the auxiliary antenna elements 251, 252, 253, 254 may boost the performance of e.g. two orthogonal linear polarizations, such that one or more auxiliary antenna elements 251, 252, 253, 254 may be present in the multi-layered structure in order to boost the performance of each polarization. Polarization describes the direction of a vector of an electric field generated by an antenna. It is defined as a curve traced by an end point of an arrow representing an instantaneous electric field vector. A single linear polarization generally means that an array of either horizontally or vertically polarized antennas is present. Dual-polarization (e.g. the above two orthogonal linear polarizations) means that two differently polarized antenna arrays are present, that is, the antennas in each of the two arrays are different, or one is rotated 90 degrees with respect to the other. Circular polarization may be achieved with a single antenna element or by combining and delaying the signal from two orthogonally polarized antenna arrays.

The more sub-layers 231, 232, 241, 242, 243, 244, 245 the display assembly 200 comprises, the more additional auxiliary antenna elements 251, 252, 253, 254 may be included at different heights. The more there are sub-layers 231, 232, 241, 242, 243, 244, 245, the more freedom there is to choose the optimal distance from the main antenna 211 for improving the performance. The included auxiliary antenna elements 251, 252, 253, 254 do not interfere with sub-6 GHz (gigahertz) elements (which are usually implemented using a metal frame of a host device) since the introduced capacitance is low and there is no connection between the added auxiliary antenna elements 251, 252, 253, 254 and the metal frame of the host device.

Additionally or alternatively, the display assembly 200 may comprise at least two auxiliary antenna elements 251, 252, 253, 254 that are arranged such that the at least two auxiliary antenna elements 251, 252, 253, 254 boost performance in an end-fire direction. In other words, the layered structure may be used to boost end-fire direction performance.

Figure 17:
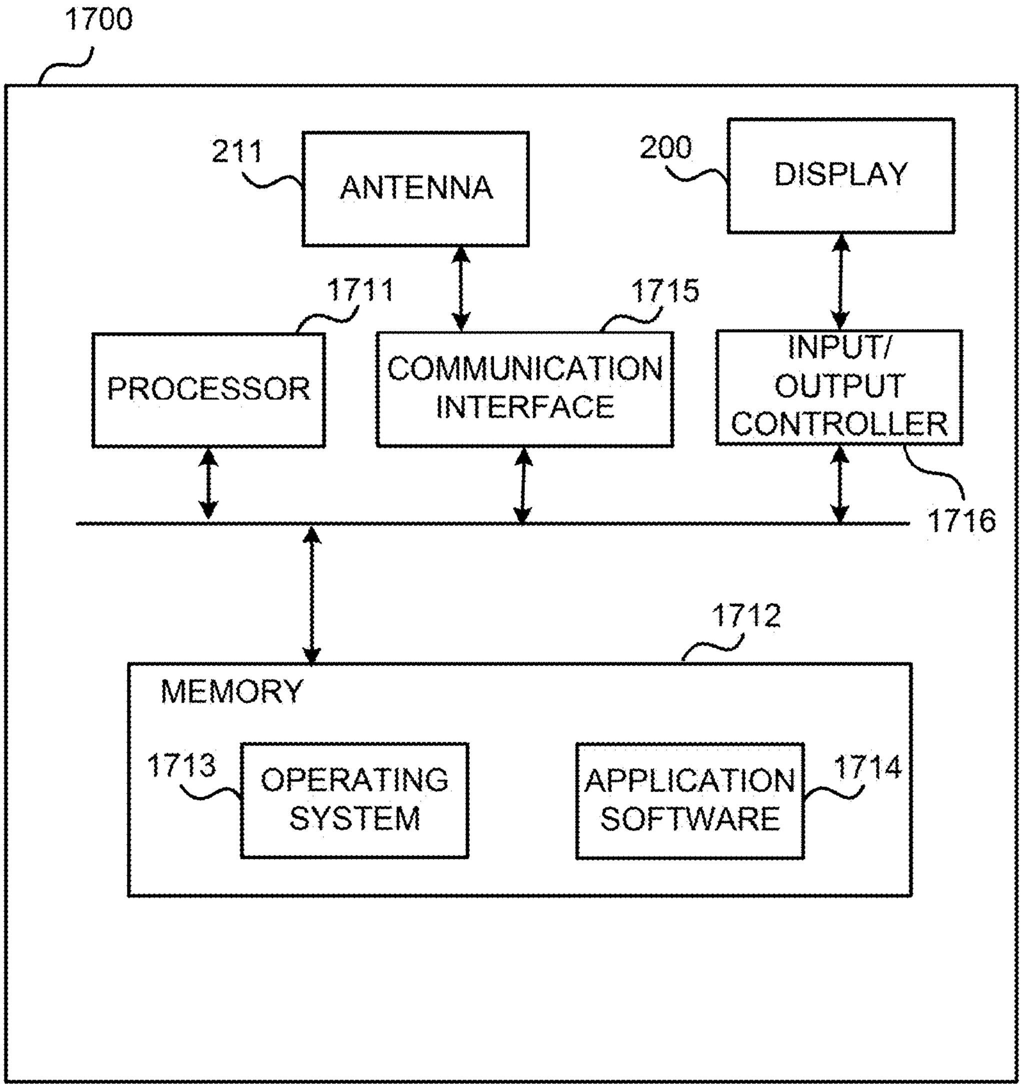
FIG. 17 is a block diagram illustrating a client device according to an embodiment of the disclosure.

At least in some embodiments, the display panel 220 may be arranged at a reduced horizontal distance from a metal frame of a host device, such as a metal frame 1750 of the client device 1700 of FIG. 17. For example, the reduced horizontal distance may comprise a horizontal distance less than two millimeters (mm).

In other words, radio frequency radiation is possible for a reduced gap (e.g. a distance d<2 mm) between the display panel 220 and the metal frame of the host device, since even though the gap is reduced, the electrical length of the gap is increased due to the high dielectric constant/permittivity, thus reducing the cut-off frequency of the gap (i.e. length of the secondary part 240 with the auxiliary antenna elements 251, 252, 253, 254). Here, the cut-off frequency is defined by the distance d.

The laminated or layered structure acts as a lens and directs antenna radiation towards the display side. The different sub-layers 231, 232, 241, 242, 243, 244, 245 allow placing the auxiliary antenna elements 251, 252, 253, 254 at an optimal distance from the main antenna element(s) 211, which can enhance the bandwidth, directivity or other antenna properties for broadside or end-fire directions. The present disclosure makes it possible to use 5G mmWave display-side antennas, since an auxiliary antenna element 251, 252, 253, 254 may be placed higher up compared to the main antenna 211 located at the substrate 210 which may be of importance especially when the distance d is small, such as 1-2 mm. Furthermore, the amount of metal surrounding the auxiliary antenna element(s) 251, 252, 253, 254 may be reduced when the auxiliary antenna element(s) 251, 252, 253, 254 are placed higher. Otherwise, the amount of surrounding metal could affect the antenna performance.

The effective antenna surface may be increased by allocation of antenna branches at a non-image region of the display panel 220, such as at OLED (organic light-emitting diode) panel and touch panel signal lines. Antenna bandwidth may be improved by using volumetric resonant elements. For example, a multilayer of mutually coupled auxiliary antenna elements 251, 252, 253, 254 may provide a connected array and coupled resonator antenna designs. The disclosed multi-layered structure is suitable, for example, for standard OLED panels and custom-made OLED panels, including antenna-on-display (AoD) panels.

Figure 3:
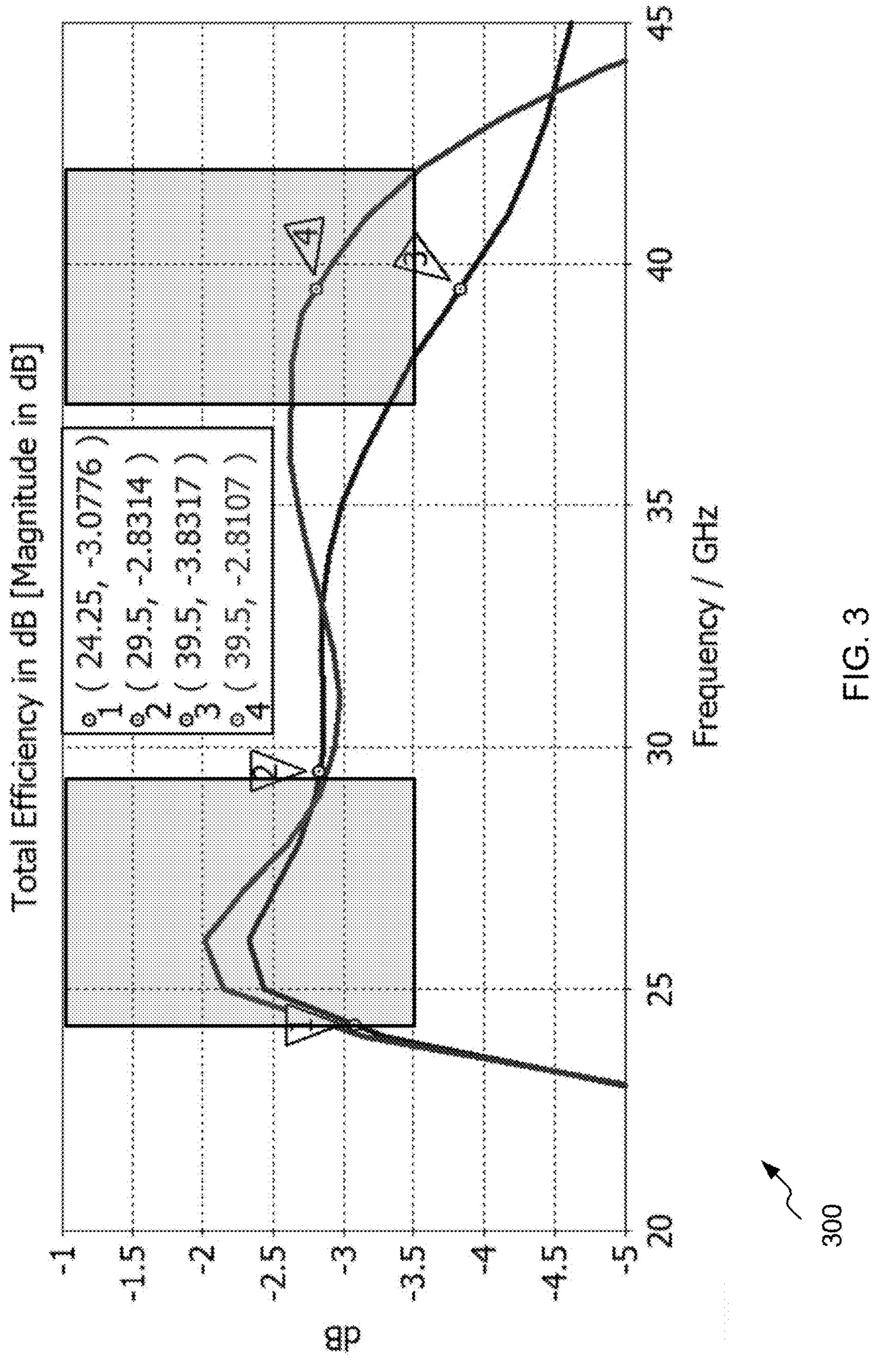
FIG. 3 is a diagram illustrating total efficiency of a reference design of a main radiator and the disclosed multi-layered structure.

Diagram 300 of FIG. 3 illustrates total efficiency of a reference design (the lower plot with points 1, 2, 3) of a main radiator and the disclosed multi-layered structure (the upper plot with point 4). That is, FIG. 3 illustrates a comparison between the present disclosure and a reference design without layered auxiliary antenna elements. Parasitic elements implemented in the layered structure enable radiation at different frequence bands. For example, as illustrated in FIG. 3, the parasitic elements enable covering a second band when placed at the optimal position, thus enabling the coverage of N257, N258, N259 and N260 bands. Hence, parasitic elements placed on the disclosed multi-layered structure allow covering e.g. an additional 37-43.5 GHz (N259 and N260) band in addition to a 24.25-29.5 GHz (N257 and N258) generated by the main radiator 211 placed on the substrate 210.

Figure 4:
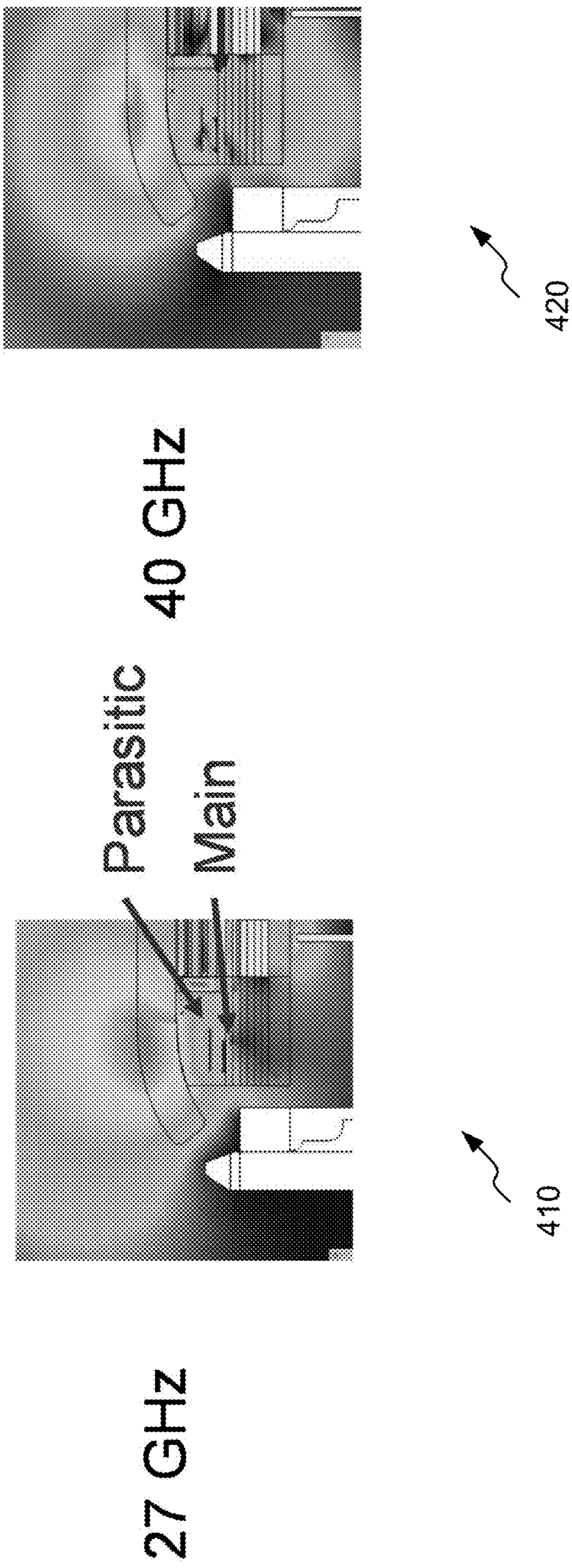
FIG. 4 is a diagram illustrating electric field distribution inside the disclosed multi-layered structure.

Diagrams 410 and 420 of FIG. 4 illustrate an example electric field distribution inside the disclosed multi-layered structure at 27 Ghz (diagram 410) and 40 GHz (diagram 420). As can be seen, at 27 GHz the stronger currents are at the main antenna element 211. Thus, at 27 GHz the main antenna element 211 is the main source of radiation. At 40 GHz, the parasitic auxiliary antenna elements of the disclosed multi-layered structure are the main source of radiation.

Figure 5:
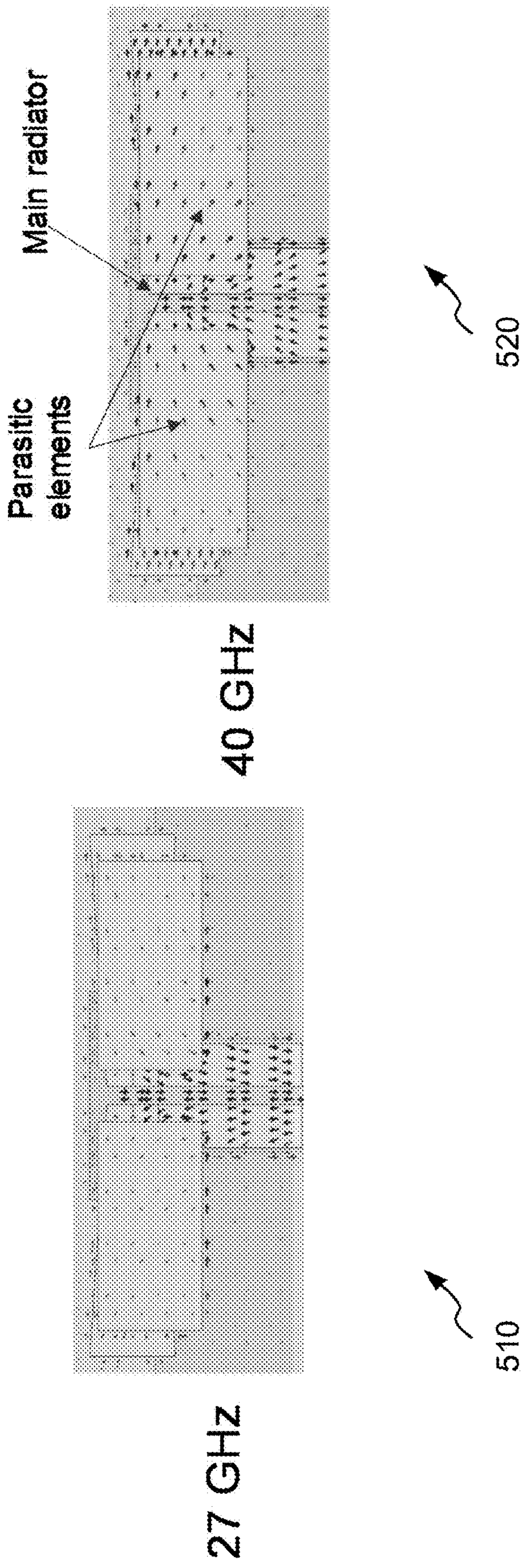
FIG. 5 is a diagram illustrating surface current on the main antenna element and parasitic auxiliary antenna elements.

Diagrams 510 and 520 of FIG. 5 illustrate surface current on the main antenna element 211 and parasitic auxiliary antenna elements of the disclosed multi-layered structure at 27 Ghz (diagram 510) and 40 GHz (diagram 520). As can be seen, there is no large effect in the surface current of the parasitic auxiliary antenna elements at the 27 Ghz band. On the other hand, strong currents are provided at the 40 GHz band as the parasitic auxiliary antenna elements boost performance.

Figure 6A:
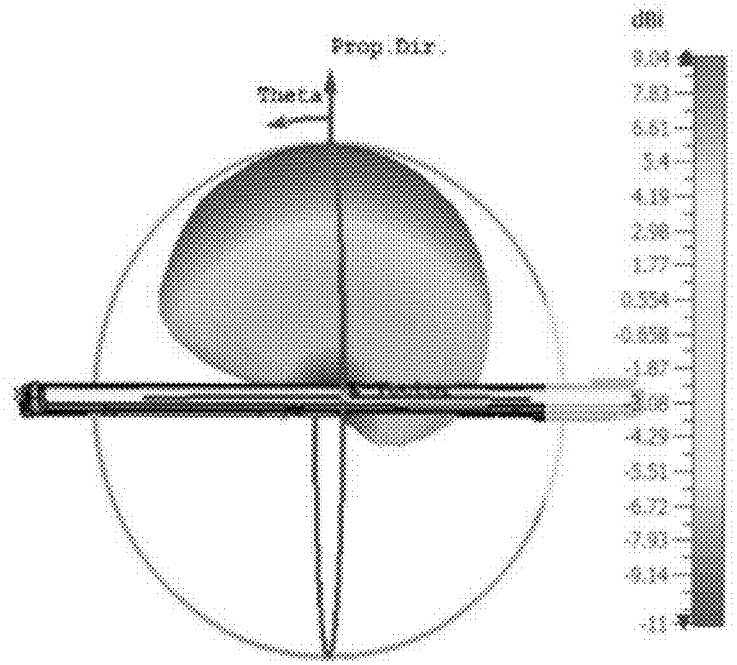
FIGS. 6A and 6B are diagrams illustrating far field realized gain for horizontal and vertical polarizations.
Figure 6A:
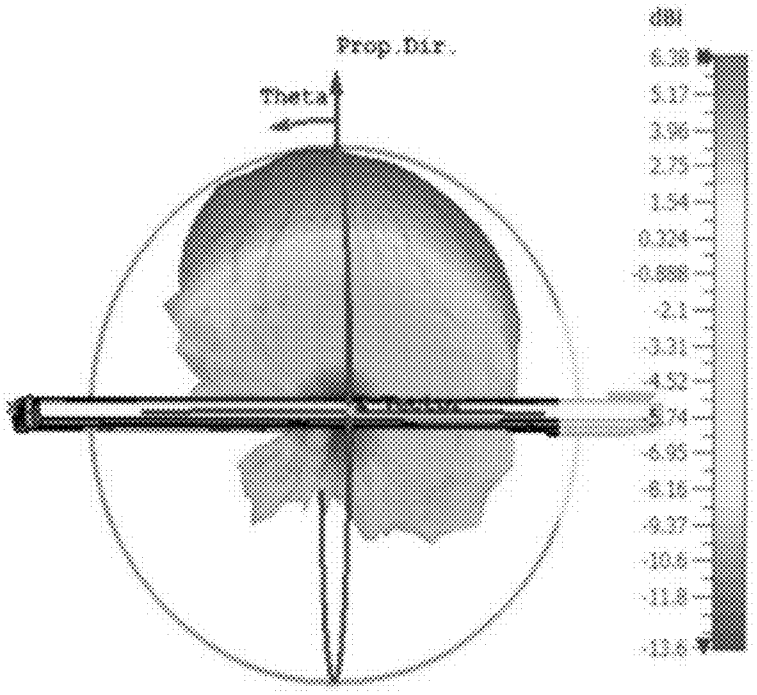
Figure 6B:
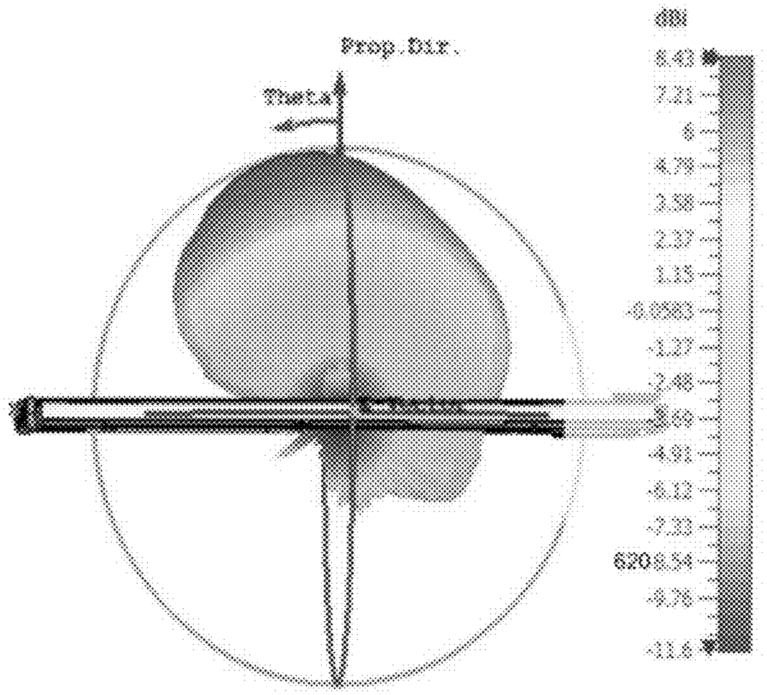
Figure 6B:
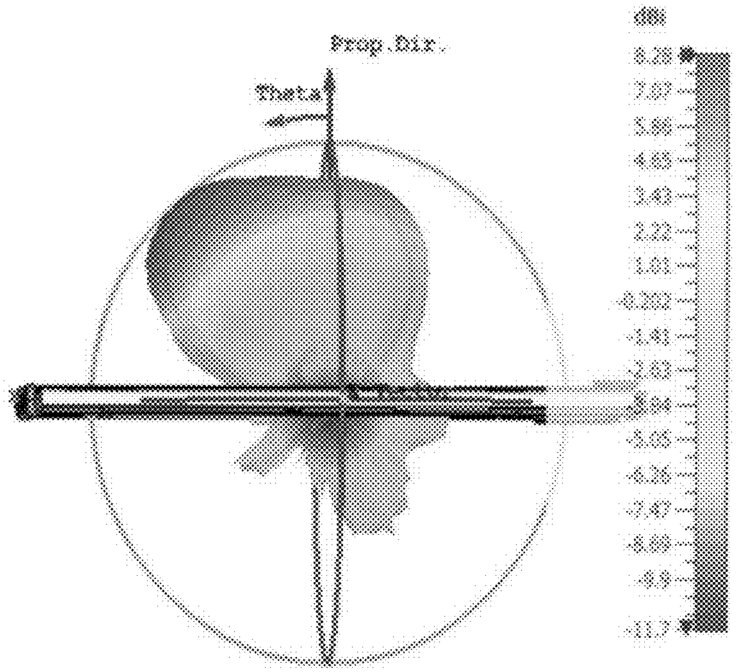

Diagrams 610 and 620 of FIGS. 6A and 6B illustrate far field realized gain for horizontal and vertical polarizations at 27 Ghz (diagram 610, FIG. 6A) and 40 GHz (diagram 620, FIG. 6B). As can be seen, the disclosed multi-layered structure may provide high and constant far field directivity. This may be enabled e.g. by director type auxiliary antenna elements implemented between sub-layers 231, 232, 241, 242, 243, 244, 245 for display-side radiation.

Figure 7A:
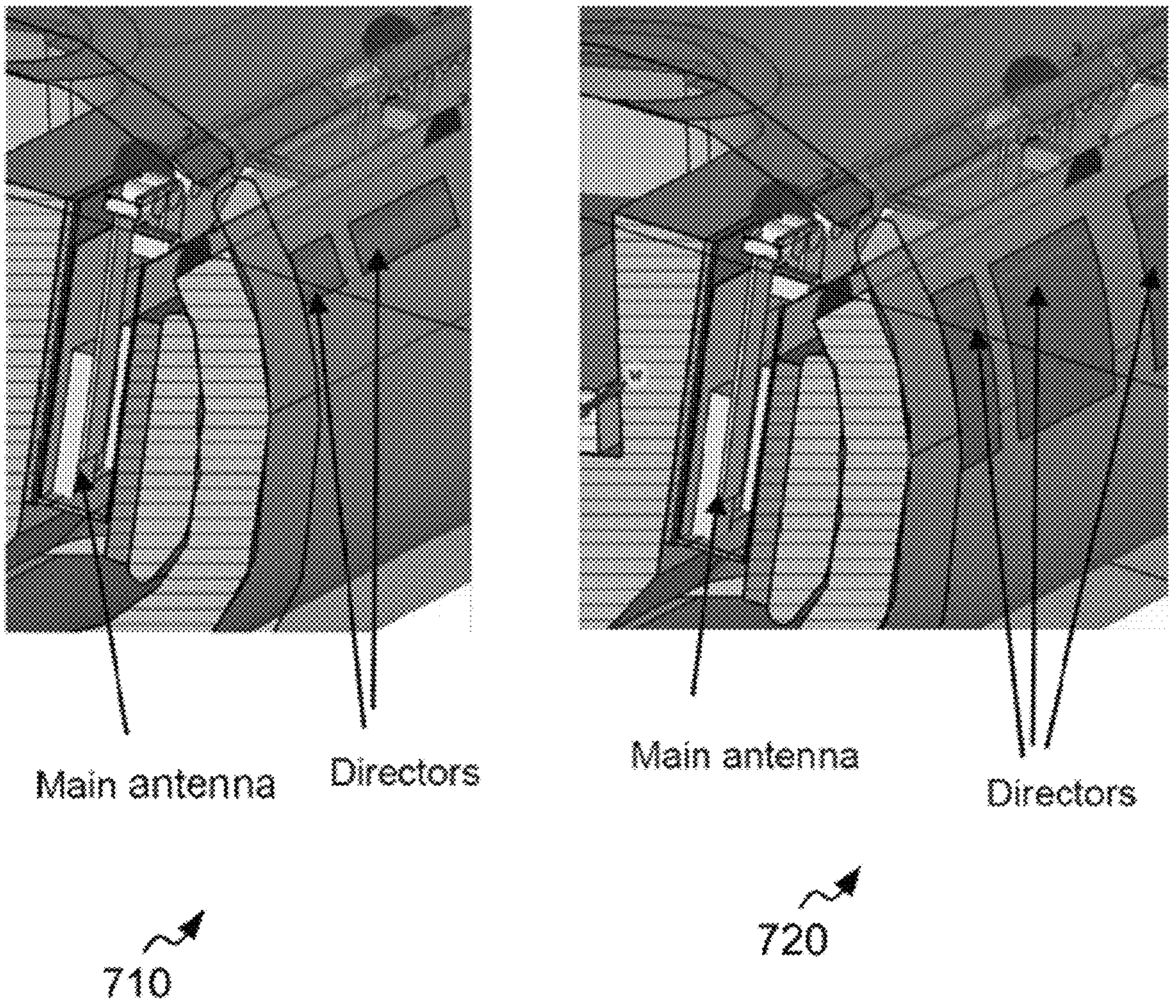
FIGS. 7A and 7B are diagrams illustrating narrow and wide end-fire directors.
Figure 7B:
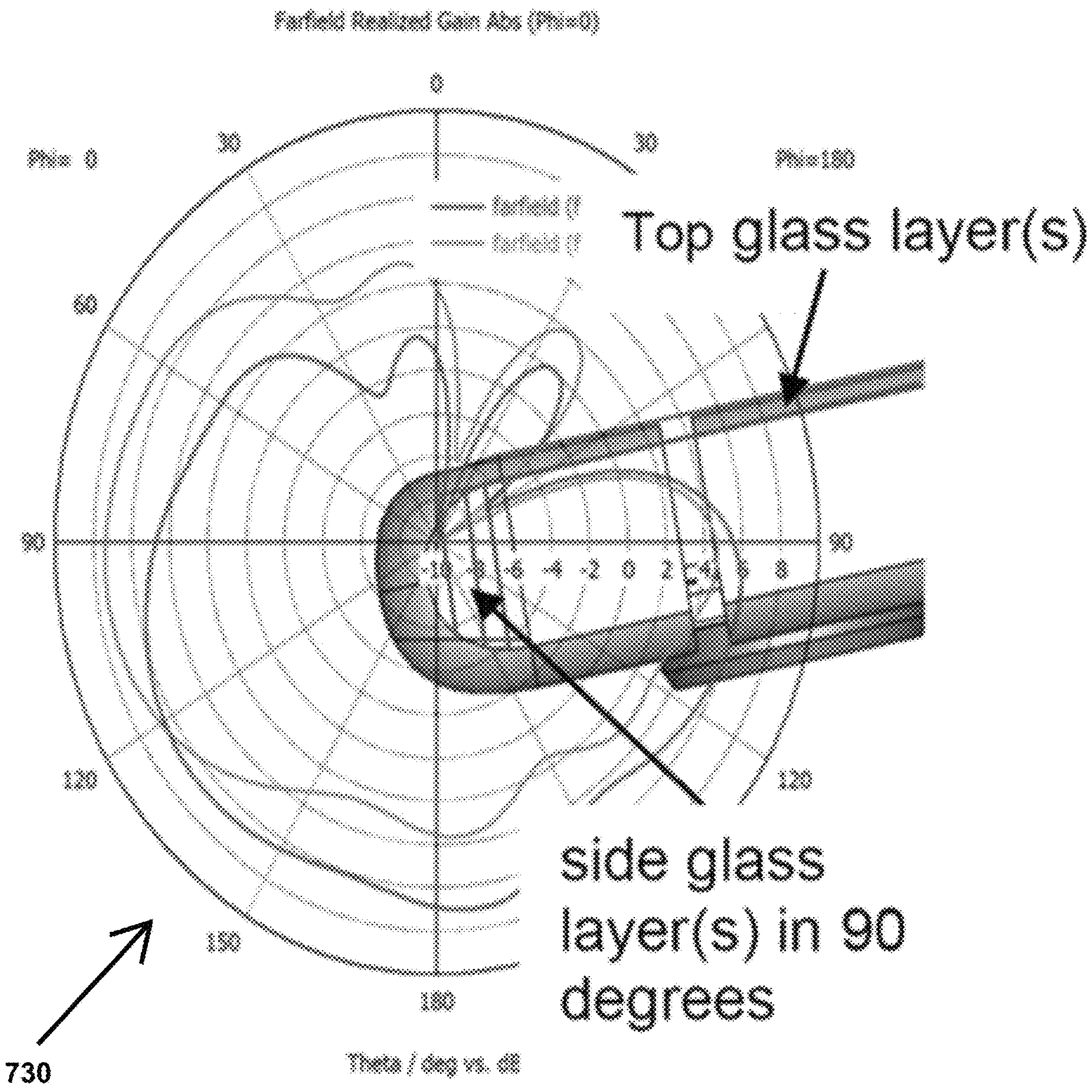

Diagrams 710 to 730 of FIGS. 7A and 7B illustrate narrow (diagram 710) and wide (diagram 730) end-fire directors of the disclosed multi-layered structure and their benefits. As can be seen, these directors may enhance both horizontal polarization (H-pol) and vertical polarization (V-pol) end-fire directivity significantly. The narrow directors may have effect on H-pol end-fire directivity. The wide directors may have an effect on both H-pol and V-pol end-fire directivity. In the example of FIGS. 7A and 7B, at least some of the sub-layers 231, 232, 241, 242, 243, 244, 245 are arranged at 90 degrees in relation to a plane surface of the display of the host device. The sub-layers 231, 232, 241, 242, 243, 244, 245 may be straight or e.g. curved to accommodate a curved shape of the host device (such as a phone). The sub-layers 231, 232, 241, 242, 243, 244, 245 may be configured in both directions, i.e. towards the display side of the host device (that is, horizontally) as well as towards a top/end side of the frame of the host device (that is, vertically).

Figure 8:
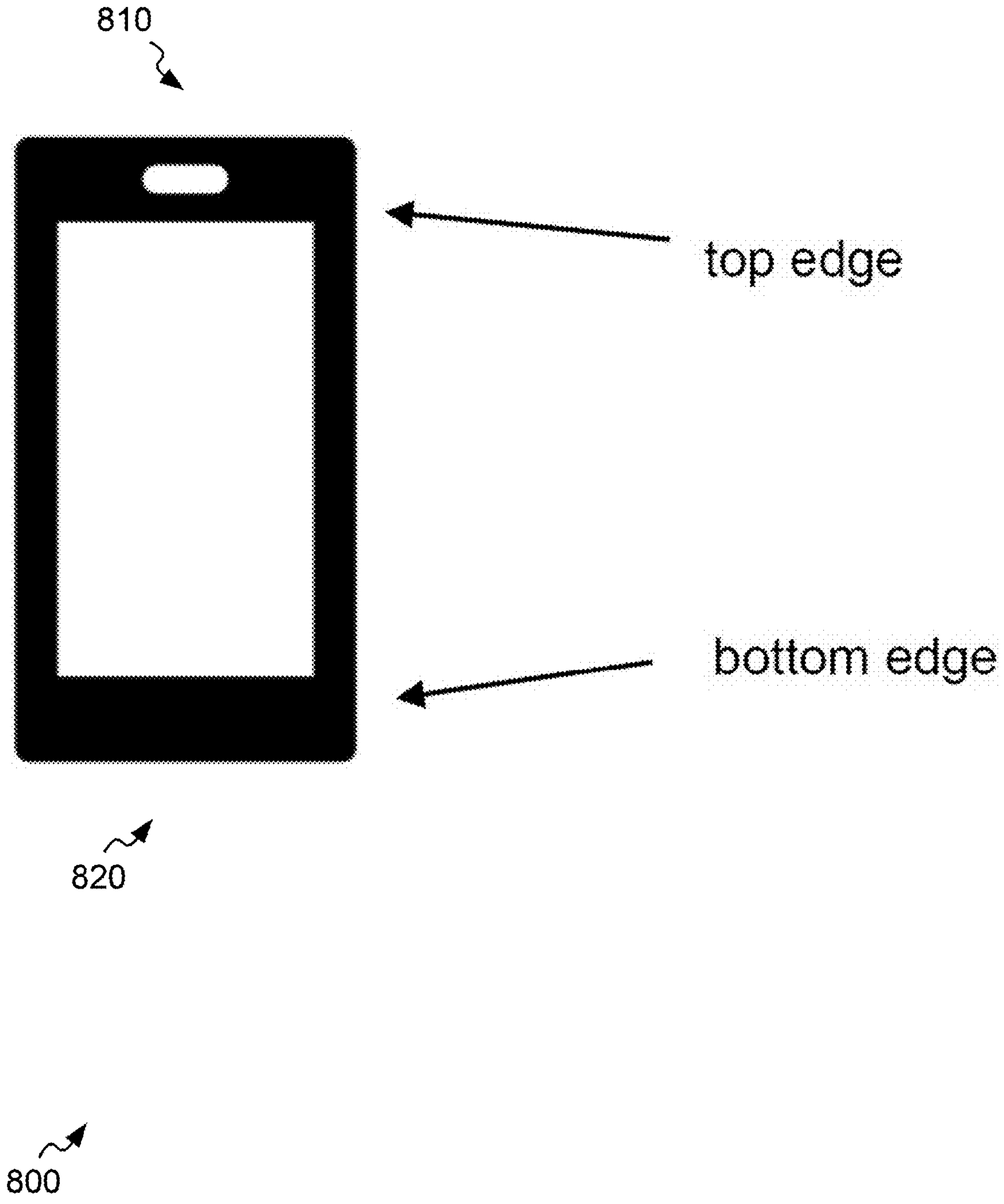
FIG. 8 is a diagram illustrating example positions for the disclosed multi-layered structure between the display and the frame.

Diagram 800 of FIG. 8 illustrates example positions for the disclosed multi-layered structure between the display and the frame of a host device. For example, the secondary part 240 may be positioned by a top edge 810 of the frame of the host device. Alternatively, the secondary part 240 may be positioned both by the top edge 810 of the frame of the host device as well as by a bottom edge 820 of the frame of the host device. The primary part 230 (e.g. with one or more sub-layers 231, 232) may extend between sub-layers of the secondary part 240, or in general cover the display side of the host device when the secondary part 240 is positioned on only one edge of the display.

Figure 9:
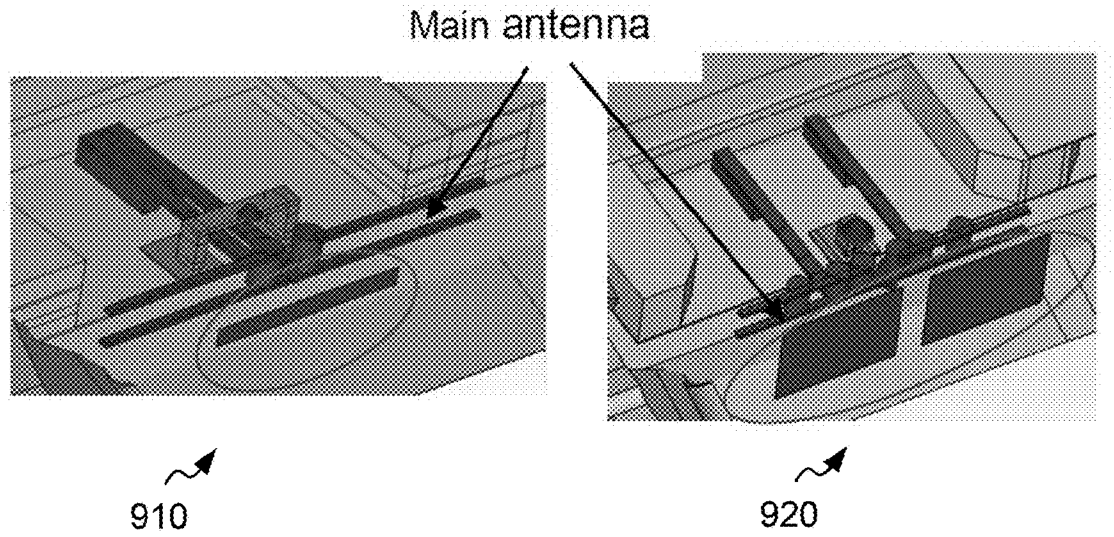
FIG. 9 is a diagram illustrating parasitic elements in the disclosed multi-layered structure.

Diagrams 910 and 920 of FIG. 9 illustrate parasitic elements in the disclosed multi-layered structure, improving the end-fire radiation. As discussed above, the disclosed multi-layered structure may be used to boost the end-fire performance. The parasitic auxiliary antenna elements shown (circled in diagrams 910 and 920) may be placed e.g. inside the glass layer and they boost the performance of the main antenna element(s) 211 placed in or on the substrate 210.

Figure 10:
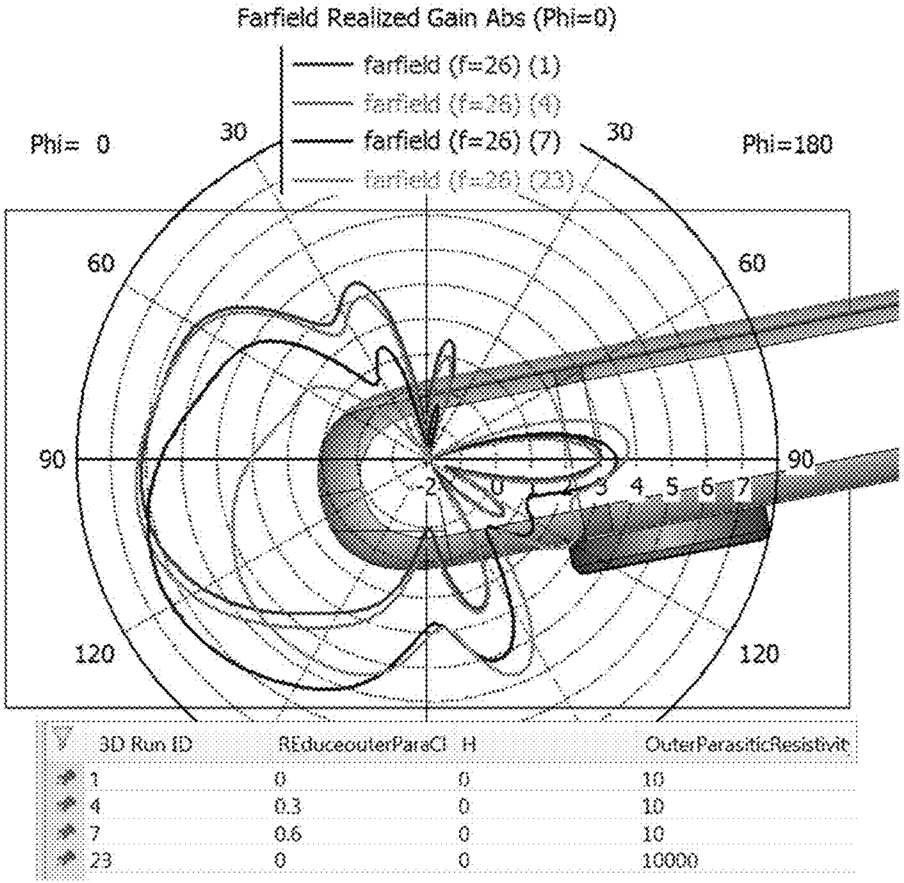
FIG. 10 is a diagram illustrating radiation patterns.

Diagram 1000 of FIG. 10 illustrates radiation patterns. Specifically, diagram 1000 further illustrates how the parasitic auxiliary antenna elements and their positioning affects beamforming represented by the radiation pattern, i.e. how the auxiliary antenna elements 251, 252, 253, 254 may direct or radiate the energy outside the host device. In diagram 1000, farfield plot 1 represents parasitic auxiliary antenna elements positioned outside the glass, providing a good beam. Farfield plot 4 represents parasitic auxiliary antenna elements positioned mid-glass which also provides a good beam. Farfield plot 7 represents parasitic auxiliary antenna elements positioned at the bottom of the glass which may cause a reduced beam. Farfield plot 23 represents an original beam with no parasitic auxiliary antenna elements arranged. As can be seen, the combination of the main antenna element(s) 211 on the substrate 210 and parasitic auxiliary antenna elements on the disclosed multi-layered structure provides high directivity and good beam-steering performance.

Figure 11:
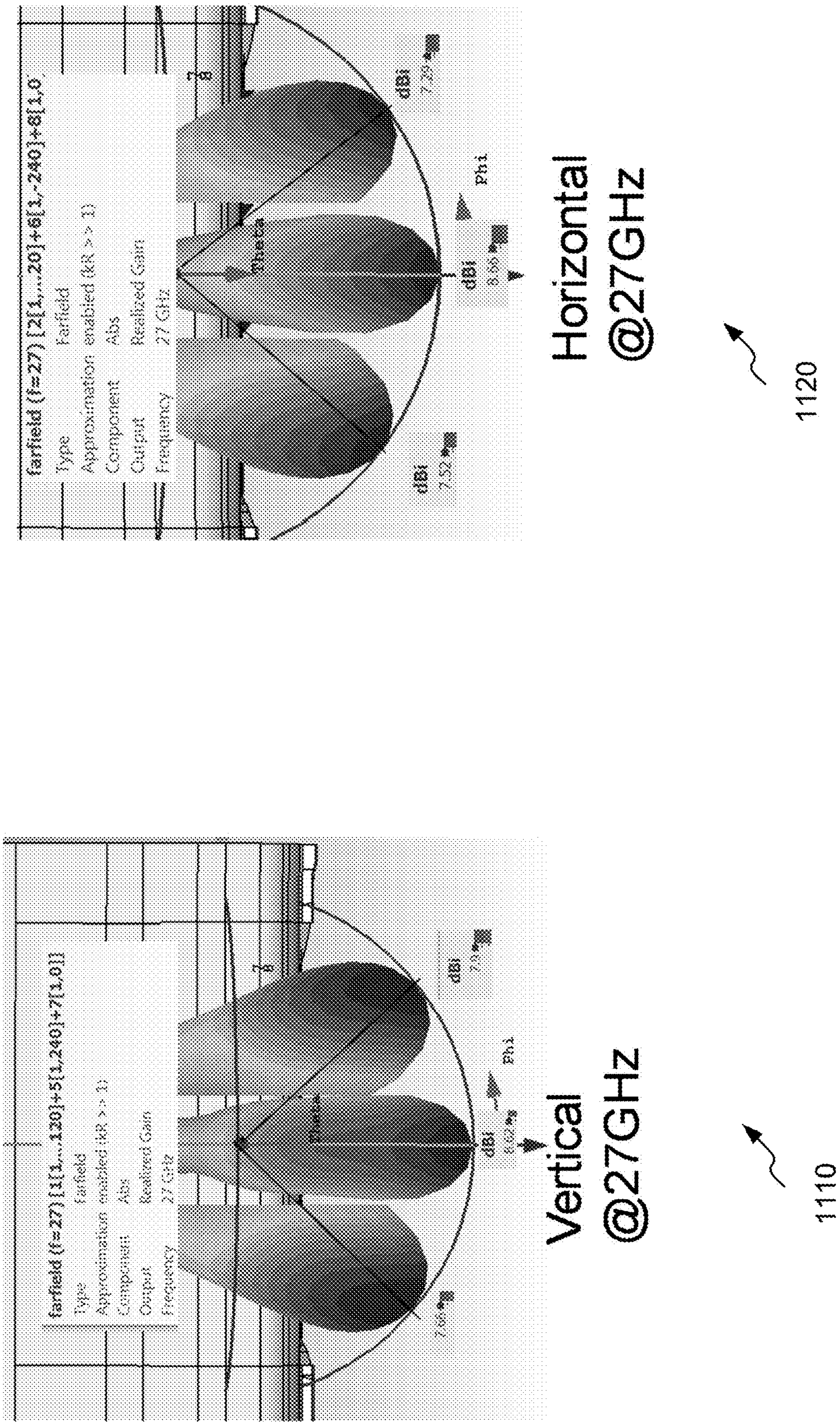
FIG. 11 is a diagram illustrating vertical and horizontal polarizations of a dual-polarized four-element array.
Figure 12:
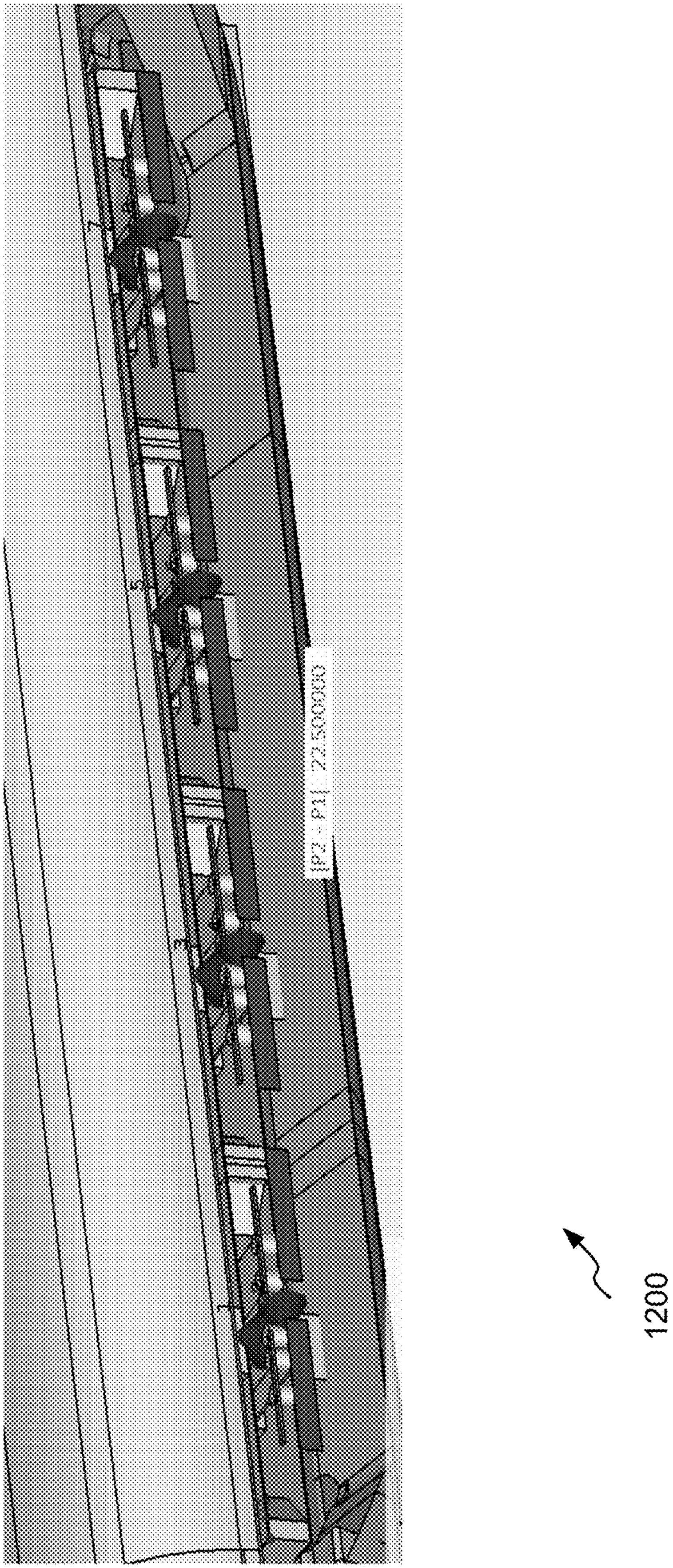
FIG. 12 is a diagram further illustrating the dual-polarized four-element array of FIG. 11.

Diagrams 1110 and 1120 of FIG. 11 illustrate end-fire radiation via vertical (diagram 1110) and horizontal (diagram 1120) polarizations of a dual-polarized four-element array, at 27 GHz. FIG. 12 is a diagram further illustrating the dual-polarized four-element array of FIG. 11. Again, as can be seen, the combination of the main antenna element(s) 211 on on the substrate 210 and parasitic auxiliary antenna elements on the disclosed multi-layered structure provides high directivity and good beam-steering performance.

Figure 13:
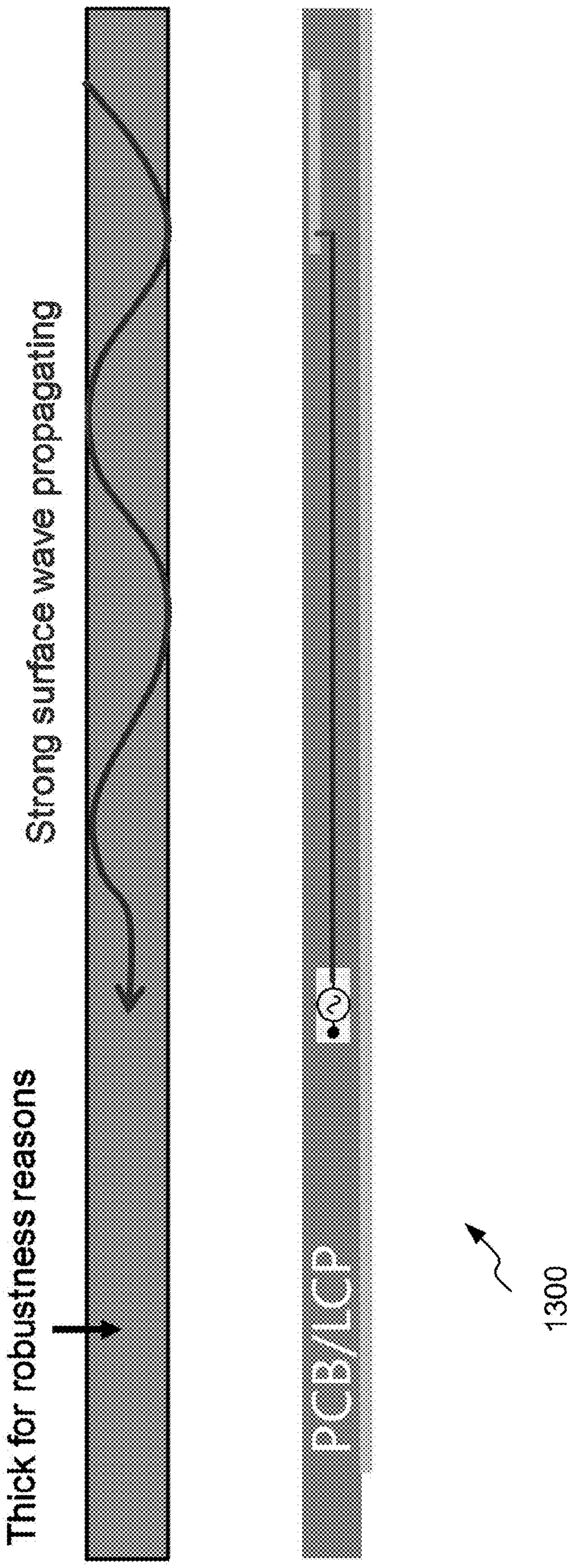
FIG. 13 is a diagram illustrating a reference structure with strong surface wave propagation.
Figure 14:
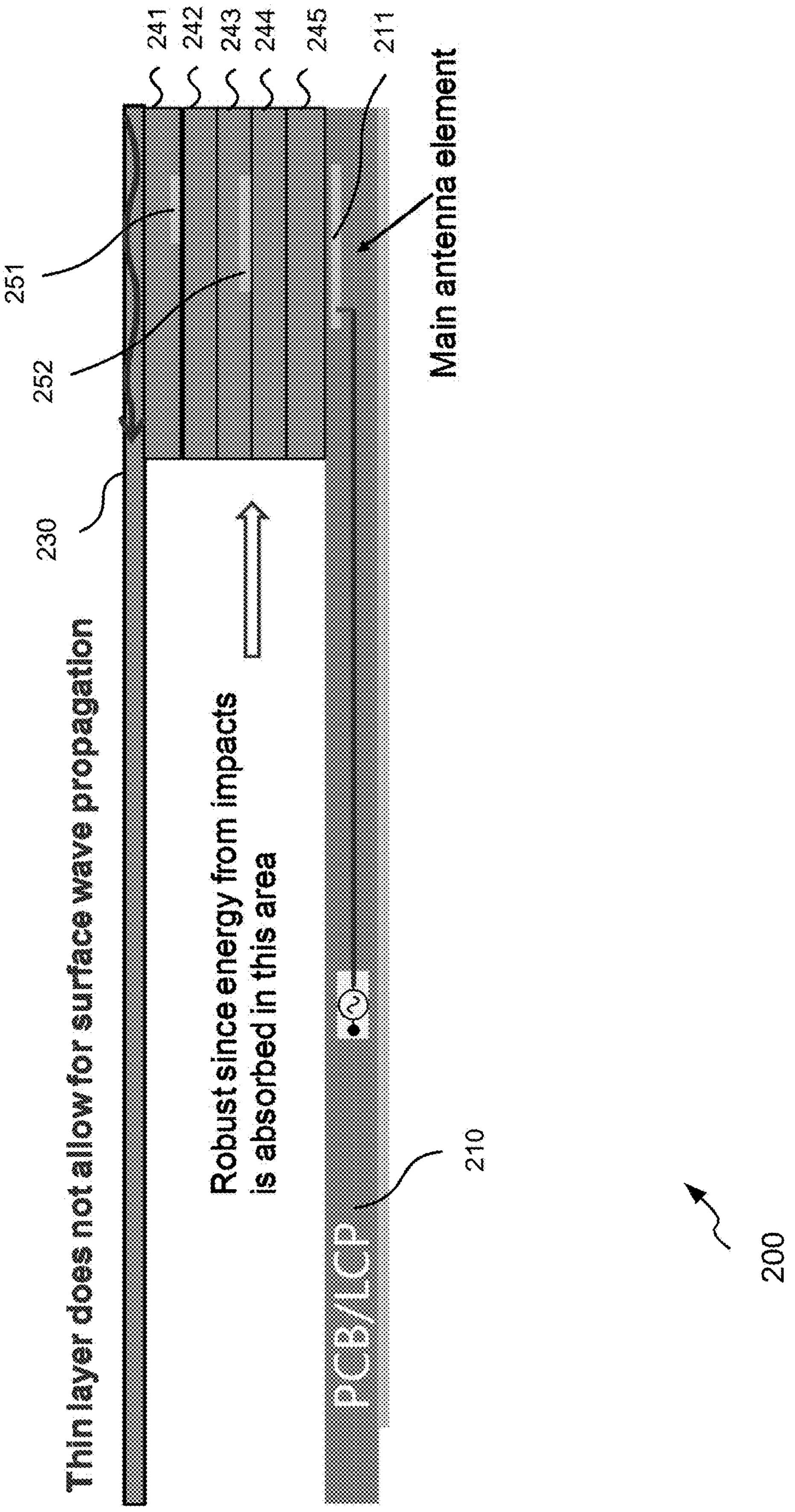
FIG. 14 is a diagram illustrating the disclosed multi-layered structure with a thin layer of glass allowing avoiding or stopping surface wave propagation.

Diagram 1300 of FIG. 13 illustrates a reference structure with strong surface wave propagation, and FIG. 14 illustrates an example of the disclosed multi-layered structure 200 with a thin layer of glass allowing avoiding or stopping surface wave propagation. As can be seen, the disclosed multi-layered structure 200 may be used to reject surface waves in addition to improving the antenna performance. The surface waves may originate, for example, from radiation of the main antenna element 211 causing traveling waves inside glass. Thus, in the reference structure of FIG. 13 a thick glass layer is used to achieve robustness. This thick layer of glass results in strong surface wave propagation. On the other hand, the disclosed multi-layered structure 200 does not require a thick primary part 230 of the glass layer since the secondary part 240 of the glass layer provides robustness. Accordingly, the primary part 230 of the glass layer maybe thin enough to not allow surface wave propagation or at least to significantly decrease the surface wave propagation.

Figure 15:
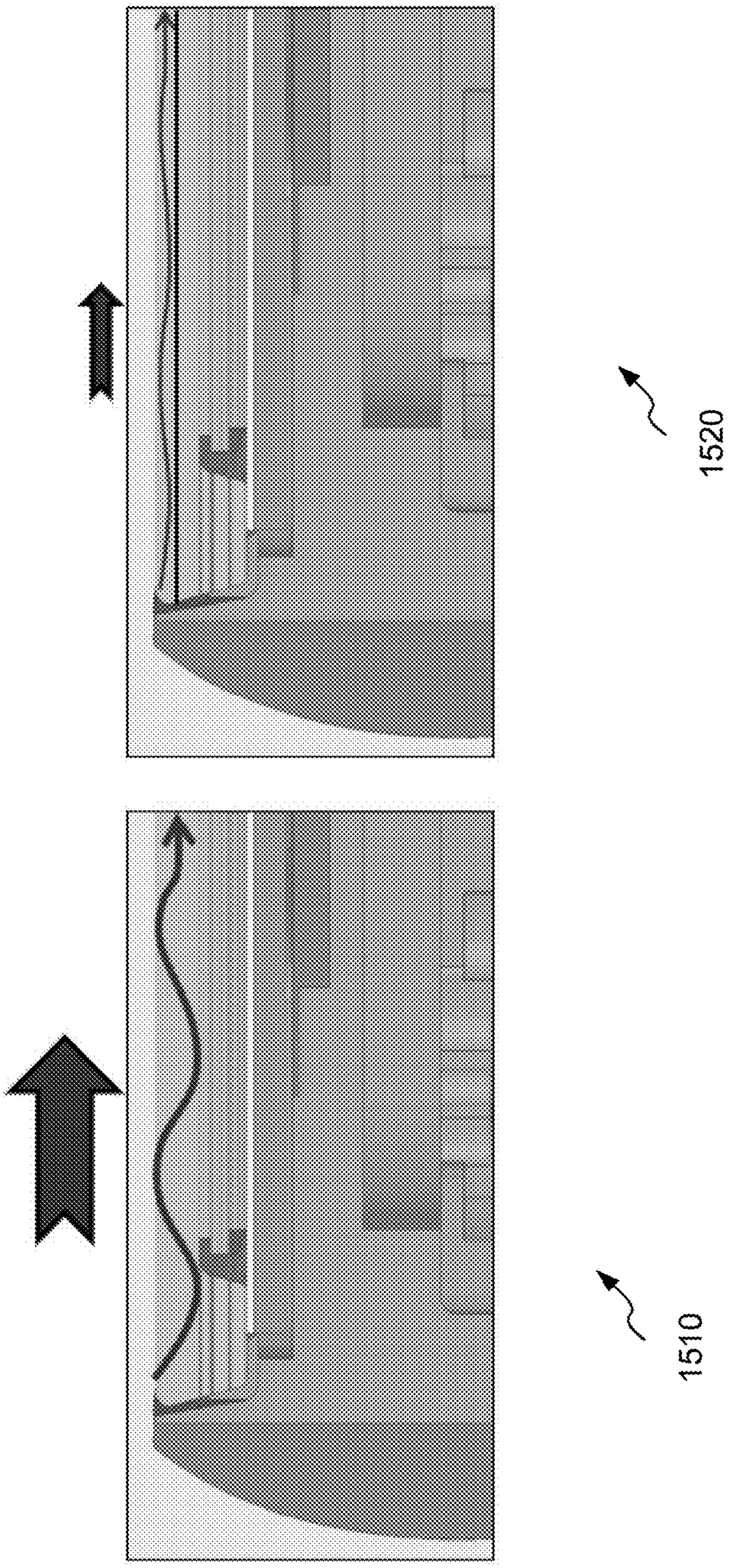
FIG. 15 is a diagram illustrating surface wave propagation inside a display.
Figure 16:
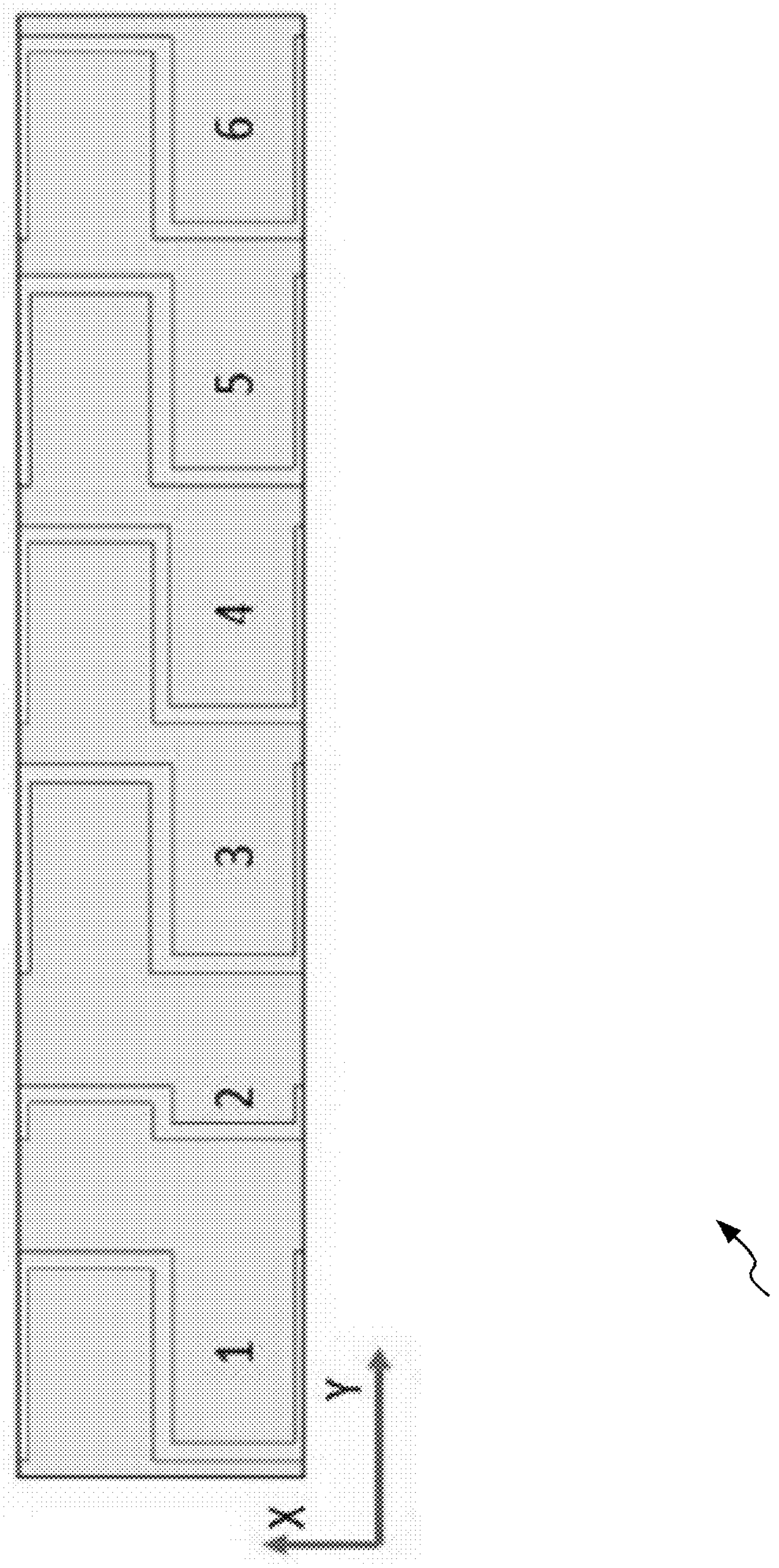
FIG. 16 is a diagram illustrating an example of a metal surface pattern for a one-sided retroreflector.

Diagrams 1510 and 1520 of FIG. 15 further illustrate surface wave propagation inside a display. The disclosed multi-layered structure 200 allows introducing surface wave rejection structures, such as a coherent retroreflector made of metal sheets (such as the one shown in diagram 1600 of FIG. 16) which allow greater performance of the common mode antennas. Diagram 1510 illustrates a strong surface wave propagating inside the display of a host device, whereas in diagram 1520 a surface wave strength or intensity is greatly diminished due to a surface wave rejection element introduced inside the primary part 230 of the glass layer of the disclosed multi-layered structure 200. Thus, in this example, the primary part 230 may comprise e.g. two sub-layers 231, 232 to allow the surface wave rejection element between them. The surface wave rejection element may not extend the whole length of the primary part 230, but instead partly, e.g. for a given distance from the beginning of the display panel 220 and towards the center of the display panel 220.

FIG. 17 is a block diagram illustrating a client device 1700 according to an embodiment of the disclosure. The client device 1700 comprises the display assembly 200 and the main antenna element 211.

The client device 1700 may further comprise one or more processors 1711 and one or more memories 1712 that may comprise computer program code. The client device 1700 may also include other elements, such as a communication interface 1715 and an input/output controller 1716, as well as other elements not shown in FIG. 17.

Although the client device 1700 is depicted to include only one processor 1711, the client device 1700 may include more processors. In an embodiment, the memory 1712 is capable of storing instructions, such as an operating system 1713 and/or various applications 1714. Furthermore, the memory 1712 may include a storage.

Furthermore, the processor 1711 is capable of executing the stored instructions. In an embodiment, the processor 1711 may be embodied as a multi-core processor, a single core processor, or a combination of one or more multi-core processors and one or more single core processors. For example, the processor 1711 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 1711 may be configured to execute hard-coded functionality. In an embodiment, the processor 1711 is embodied as an executor of software instructions.

The memory 1712 may be embodied as one or more volatile memory devices, one or more non-volatile memory devices, and/or a combination of one or more volatile memory devices and non-volatile memory devices. For example, the memory 1712 may be embodied as semiconductor memories (such as mask ROM, PROM (programmable ROM), EPROM (erasable PROM), flash ROM, RAM (random access memory), etc.).

The client device 1700 may be e.g. any of various types of devices used directly by an end user entity and capable of communication in a wireless network, such as user equipment (UE). Such devices include but are not limited to smartphones, tablet computers, smart watches, internet-of-things (IoT) devices, enhanced mobile broadband (eMBB) devices, etc.

Further features of the client device 1700 related to the display assembly 200 directly result from the features and parameters of the display assembly 200 and thus are not repeated here.

Figure 18:
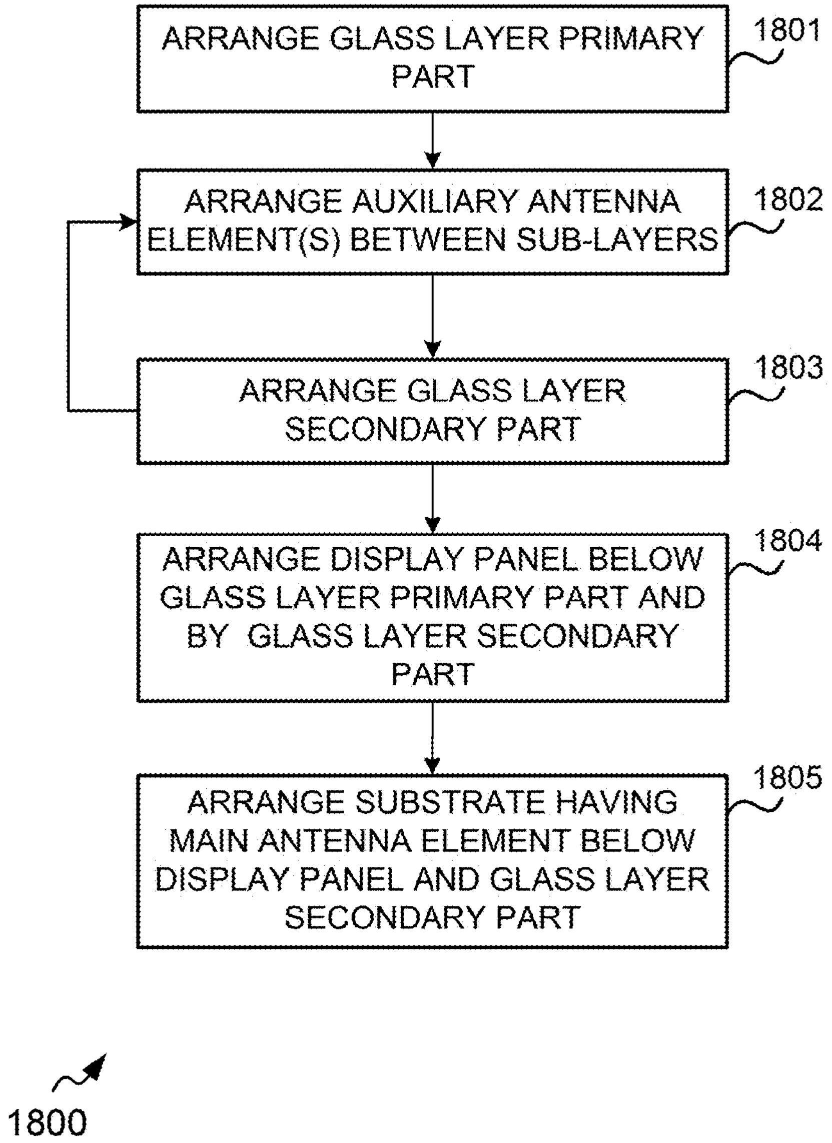
FIG. 18 is a flow diagram illustrating a method of manufacturing according to an embodiment of the present disclosure.

FIG. 18 is a flow diagram illustrating a method 1800 of manufacturing the display assembly 200 according to an embodiment of the present disclosure.

At operation 1801, a primary part 230 of a glass layer is arranged, wherein the primary part 230 is to be extended over a display panel 220.

At operation 1802, at least one auxiliary antenna element 251, 252, 253, 254 is arranged, such that each auxiliary antenna element 251, 252, 253, 254 is arranged between two adjoining sub-layers 231, 232, 241, 242, 243, 244, 245 of at least one of the primary part 230 of the glass layer or a secondary part 240 of the glass layer, wherein at least one of the primary part 230 and the secondary part 240 comprises at least two sub-layers 231, 232, 241, 242, 243, 244, 245.

At operation 1803, the secondary part 240 of the glass layer is arranged, wherein the secondary part 240 is to be extended by the display panel 220 towards an upper surface of a substrate 210.

Operations 1802 and 1803 may be iterated several times, as shown in FIG. 18.

At operation 1804, the display panel 220 is arranged below the primary part 230 of the glass layer and by the secondary part 240 of the glass layer.

At operation 1805, the substrate 210 is arranged below the display panel 220 and the secondary part 240 of the glass layer, wherein the substrate 210 comprises a main antenna element 211.

Further features of the method 1800 directly result from the features and parameters of the display assembly 200 and thus are not repeated here.

Any range or device value given herein may be extended or altered without losing the effect sought. Further, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of example embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A display assembly, comprising:

a substrate comprising a main radiating antenna element;

a display panel arranged above the substrate;

a glass layer comprising a primary part extending over the display panel and a secondary part extending by the display panel towards an upper surface of the substrate, at least one of the primary part and the secondary part comprising at least two sub-layers; and a first auxiliary radiating antenna element arranged between two adjoining sub-layers of the at least two sub-layers.

2. The display assembly according to claim 1, wherein the secondary part is arranged at least partially above the main radiating antenna element.

3. The display assembly according to claim 1, wherein the sub-layers of the secondary part comprise a material having a high permittivity.

4. The display assembly according to claim 3, wherein the high permittivity comprises permittivity larger than four.

5. The display assembly according to claim 3, wherein the material having the high permittivity comprises glass, plastic or ceramics.

6. The display assembly according to claim 1, wherein the first auxiliary radiating antenna element comprises a parasitic element, a director, a reflector, or a surface wave rejector.

7. The display assembly according to claim 1, wherein the display assembly further comprises a second auxiliary radiating antenna element, wherein the first and the second auxiliary radiating antenna elements are each arranged at a different vertical distance from the main radiating antenna element.

8. The display assembly according to claim 7, wherein at least a second of the two adjoining sub-layers physically separates the second auxiliary radiating antenna element from the first auxiliary radiating antenna element and the main radiating antenna element.

9. The display assembly according to claim 8, wherein the first and the second auxiliary radiating antenna elements are each arranged at different vertical distances from the main radiating antenna element to enable radiation at multiple frequency bands.

10. The display assembly according to claim 1, wherein the display assembly further comprises a second auxiliary radiating antenna element arranged such that the first and the second auxiliary radiating antenna elements boost performance of at least one of: a single linear polarization, two orthogonal linear polarizations, and/or circular polarization.

11. The display assembly according to claim 1, wherein the display assembly further comprises a second auxiliary radiating antenna element, wherein the first and the second auxiliary radiating antenna elements are each arranged such that the first and the second auxiliary radiating antenna elements boost end-fire direction performance.

12. The display assembly according to claim 1, wherein the display panel is arranged at a reduced horizontal distance from a metal frame of a host device.

13. The display assembly according to claim 12, wherein the reduced horizontal distance comprises a horizontal distance less than two millimeters.

14. The display assembly according to claim 1, wherein the first auxiliary radiating antenna element is metallic.

15. A client device comprising the display assembly according to claim 1.

16. The display assembly according to claim 1, wherein each of the at least two sub-layers extending parallel to the upper surface of the substrate, and wherein at least a first of the two adjoining sub-layers is disposed between the first auxiliary radiating antenna element and both the main radiating antenna element and the substrate.

17. The display assembly according to claim 16, wherein the primary part and the secondary part of the glass layer are formed as integral portions a unitary glass structure, wherein the unitary glass structure is formed from a plurality of laminated glass layers, the plurality of laminated glass layers comprising the at least two sub-layers.

18. The display assembly according to claim 1, wherein the first auxiliary radiating antenna element is electromagnetically coupled to the main antenna radiating element, and wherein at least a first of the two adjoining sub-layers is disposed between the first auxiliary antenna element and both the main antenna element and the substrate.

19. The display assembly according to claim 18, wherein the first auxiliary radiating antenna element is configured to modify an electromagnetic field distribution of the main antenna radiating element.

20. A method of manufacturing a display assembly, the method comprising:

arranging a primary part of a glass layer configured to extend over a display panel;

arranging a first auxiliary radiating antenna element between two adjoining sub-layers of at least one of the primary part of the glass layer or a secondary part of the glass layer, wherein at least one of the primary part and the secondary part comprises at least two sub-layers;

arranging the secondary part of the glass layer, the secondary part configured to extend by the display panel towards an upper surface of a substrate;

arranging the display panel below the primary part of the glass layer and by the secondary part of the glass layer; and arranging the substrate below the display panel and the secondary part of the glass layer, wherein the substrate comprises a main radiating antenna element.

* * * * *